(12) United States Patent
Michaelis et al.

(10) Patent No.: US 11,431,508 B1
(45) Date of Patent: Aug. 30, 2022

(54) DISTRIBUTED LEDGER-BASED AD-HOC SYSTEM, APPARATUS AND METHOD

(71) Applicant: Beyond Aerospace Ltd., Kelowna (CA)

(72) Inventors: Oliver Michaelis, San Diego, CA (US); Mike Ball, Kelowna (CA); Charles Andrew Hugh Baker, Kelowna (CA); Peter Alexander Carides, San Diego, CA (US)

(73) Assignee: Beyond Aerospace LTD.

( * ) Notice: Subject to any disclaimer, the term of this patent is extended or adjusted under 35 U.S.C. 154(b) by 0 days.

(21) Appl. No.: 17/728,180

(22) Filed: Apr. 25, 2022

Related U.S. Application Data

(60) Division of application No. 17/467,193, filed on Sep. 4, 2021, now Pat. No. 11,316,700, which is a continuation-in-part of application No. 17/386,377, filed on Jul. 27, 2021.

(60) Provisional application No. 63/214,326, filed on Jun. 24, 2021.

(51) Int. Cl.

| | |
|---|---|
| *G06Q 20/00* | (2012.01) |
| *H04L 9/32* | (2006.01) |
| *H04L 45/02* | (2022.01) |
| *H04L 9/40* | (2022.01) |
| *H04L 9/00* | (2022.01) |

(52) U.S. Cl.
CPC ............ *H04L 9/3247* (2013.01); *H04L 45/02* (2013.01); *H04L 45/10* (2013.01); *H04L 63/0428* (2013.01); *H04L 63/102* (2013.01); *H04L 9/50* (2022.05); *H04L 2209/04* (2013.01)

(58) Field of Classification Search
CPC ....... H04L 9/3247; H04L 45/02; H04L 45/10; H04L 63/0428; H04L 63/102; H04L 9/50; H04L 2209/04
USPC .................. 705/16, 21, 59; 380/44, 262, 278
See application file for complete search history.

(56) References Cited

U.S. PATENT DOCUMENTS

2003/0035424 A1    2/2003   Abdollahi

FOREIGN PATENT DOCUMENTS

KR    20110104524 A   *  9/2011   ......... H04L 12/2801

OTHER PUBLICATIONS

Barr David Foreign Reference (Year: 2008) (Year: 2008).*
May Thura Lwin, Jinhyuk Yim and Young-Bae Ko, Blockchain-Based Lightweight Trust Management in Mobile Ad-Hoc Networks, open access article, Jan. 27, 2020, pp. 1-19, MDPI, Basel, Switzerland.

(Continued)

*Primary Examiner* — Dante Ravetti
(74) *Attorney, Agent, or Firm* — Thibault Patent Group

(57) ABSTRACT

A system, method and apparatus for routing traffic in ad-hoc networks. A routing blockchain network processes routing node information proposals received from manager nodes of network clusters. Performance metrics of one or more nodes in the system are verified using distributed ledger techniques and provided to the manager nodes as updates to each manager node's routing information. The manager nodes further determine routing paths for ad-hoc communication requests based on an authentication event that defines conditions necessary to route traffic streams in association with a particular resource.

25 Claims, 15 Drawing Sheets

(56) References Cited

OTHER PUBLICATIONS

Rafael Belchior, Benedikt Putzy, Guenther Pernuly, Miguel Correia, Andre Vasconcelos and Sergio Guerreiro, SSIBAC: Self-Sovereign Identity Based Access Control, scholarly paper, Feb. 9, 2021, pp. 1-9, IEEE, New York, United States.

Kaliya Young, Verifiable Credentials Flavors Explained, technical article, date unknown, pp. 1-21, The Linux Foundation, San Francisco, United States.

Tykn, Blockchain Identity Management: The Definitive Guide (2021 Update), Internet article, May 19, 2021, https://tykn.tech/identity-management-blockchain/.

Tyler Ruff, Verifiable Credentials 101 for SSI with Tyler Ruff—Decentralized Digital Identity, Youtube video, Sep. 18, 2018, https://www.youtube.com/watch?v=6O_iJnhlh5o.

\* cited by examiner

```
1   {
2     "@context": [
3       "https://www.w3.org/2018/credentials/v1",
4       "https://ares.beyondaerospace.com/2021/credentials/aae/v1"
5     ],
6     "id": "http://ares-customer.com/credentials/3732",
7     "type": ["VerifiableCredential", "AAECredential"],
8     "issuer": "https://ares-customer.com/issuers/18",
9     "issuanceDate": "2021-04-18T19:23:24Z",
10    "expirationDate": "2021-04-18T19:24:24Z",
11    "credentialSubject": {
12        "id": "did:hyperdrive.ares-customer.com:ebfeb1f712ebc6f1c276e12ec21",
13        "access": {[{"read": ["screen-presence"]},
14                    {"store": ["ram", "disk-encrypted"]}
15        ]},
16    "pkNonce": "8eGWSiTiWtEA8WnBwX4T259STpxpRKuk...kpFnikqqSP3GMW7mVxC4chxFhVs"
17  } ,
18    "proof": { ... }
19  }
```

FIG. 4

DISTRIBUTED LEDGER-BASED AD-HOC SYSTEM, APPARATUS AND METHOD

CROSS-REFERENCE TO RELATED APPLICATIONS

This application is a divisional of U.S. application Ser. No. 17/467,193, filed on Sep. 4, 2021, which is a continuation-in-part of U.S. application Ser. No. 17/386,377, filed on Jul. 27, 2021, which claims the benefit of U.S. provisional patent application 63/214,326, filed on Jun. 24, 2021.

BACKGROUND

Field of Use

The present invention relates to the field of computer networking and more specifically to a system, method and apparatus for using distributed ledger technology to manage ad-hoc networks.

Description of the Related Art

Ad-hoc networks are wired or wireless communication networks are decentralized networks that do not rely on pre-existing infrastructure, such as routers in wired networks or access points in wireless networks in order for "nodes" to communicate with each other. A wireless ad-hoc network may be referred to as a "WANET" while a mobile ad-hoc network may be referred to as a "MANET". Generally, each "node" in an ad-hoc network forwards traffic from one node to another, where a determination of which nodes forward the information is made dynamically on the basis of network connectivity and a routing algorithm used by the network.

A primary advantage of ad-hoc networks is that no centralized communication device is needed. Another advantage is that nodes can easily join or leave such networks, allowing for dynamic network scaling. Yet another advantage of ad-hoc networks is that they may be created very quickly, without the need for additional hardware or software.

Ad-hoc networks, however, suffer from several drawbacks. Chief among them is that the information used to select which nodes will participate in an ad-hoc communication may not be up to date, especially in mobile ad-hoc networks, where location and connectivity information may change rapidly as nodes move within a network, or worse, move outside a network no longer in communication with other nodes.

Another drawback in ad-hoc networks is that the nodes selected for an ad-hoc communication typically do not account for different types of traffic having different security requirements, Quality of Service requirements, Observability requirements (i.e., an ability to mask traffic with noise or by using other techniques to prevent the traffic from being observed by an unauthorized third party), or other requirements. Typically, nodes are selected based on a past ability to connect to other nodes.

It would be desirable to overcome the shortcomings of the prior art, to assign nodes to ad-hoc communications based on other metrics besides connectivity, and to do so in a secure, robust manner.

SUMMARY

The embodiments herein describe systems, methods and apparatus for routing traffic streams in ad-hoc networks. In one embodiment, a method is described, performed by a source node of a network cluster, comprising sending, by a processor via a communication interface coupled to the processor, an ad-hoc route request to a manager node of the network cluster, the ad-hoc route request comprising one or more routing conditions associated with a particular resource, the one or more routing conditions defining one or more minimum characteristics of any router nodes in a routing path between the source node and a destination node coupled to the particular resource, receiving, by the processor via the communication interface, a proposed routing path from the manager node, the proposed routing path comprising an identification of one or more routing nodes in a communication path from the source node to the destination node where the particular resource may be accessed, each of the one or more routing nodes meeting or exceeding the one or more routing conditions, sending, by the processor via the communication interface, a route validation message to the destination node via the one or more routing nodes identified in the proposed routing path, receiving, by the processor via the communication interface, a response message from the destination node via the one or more routing nodes identified in the proposed routing path, the response message cryptographically signed by each of the one or more routing nodes identified in the proposed routing path, verifying, by the processor, that the response message was cryptographically signed by each of the one or more routing nodes identified in the proposed routing path and receiving, by the processor via the communication interface, a traffic stream from the particular destination node via the one or more routing nodes identified in the proposed routing path when the response message was cryptographically signed by each of the one or more routing nodes identified in the proposed routing path.

In another embodiment, a method is described for routing traffic streams in ad-hoc networks, performed by a manager node of a network cluster, comprising receiving, by a processor of the manager node via a communication interface coupled to the processor, a route request message from a source node of the network cluster, determining, by the processor, a proposed routing path between the source node and a particular destination node based on a comparison of one or more routing node performance metrics stored on an information storage device coupled to the processor and the one or more routing conditions, and sending, by the processor via the communication interface, the proposed routing path to the source node for verification of the proposed routing path.

In yet another embodiment, a node of an ad-hoc network cluster is described, comprising a communication interface for sending and receiving information to other nodes, a non-transitory information storage device for storing processor-executable instructions and one or more routing conditions associated with a particular resource, the one or more routing conditions defining one or more characteristics of any router nodes in a routing path to be determined between the source node and a destination node coupled to the particular resource, and a processor coupled to the communication interface and the non-transitory information storage device, for executing the processor-executable instructions that cause the node to send, by the processor via the communication interface, an ad-hoc route request to a manager node of the network cluster, the ad-hoc route request comprising the one or more routing conditions, receive, by the processor via the communication interface, a proposed routing path from the manager node, the proposed routing path comprising an identification of one or more routing nodes in a routing path from the source node to a particular destination node coupled to the resource, each of the one or more routing nodes meeting or exceeding the one or more routing conditions, send, by the processor via the communication interface, a route validation message to the particular destination node via the one or more routing nodes identified in the proposed routing path, receive, by the processor via the communication interface, a response message from the particular destination node via the one or more routing nodes identified in the proposed routing path, the response message cryptographically signed by each of the one or more routing nodes identified in the proposed routing path, verify, by the processor, that the response message was cryptographically signed by each of the one or more routing nodes identified in the proposed routing path and receive, by the processor via the communication interface, a traffic stream from the particular destination node via the one or more routing nodes identified in the proposed routing path when the response message was cryptographically signed by each of the one or more routing nodes identified in the proposed routing path.

In yet still another embodiment, a manager node of a network cluster is described, comprising a communication interface for sending and receiving information to other nodes, a non-transitory information storage device for storing processor-executable instructions and one or more routing conditions associated with a particular resource, the one or more routing conditions defining one or more characteristics of any router nodes in a routing path to be determined between a source node and a destination node coupled to the particular resource, and a processor coupled to the communication interface and the non-transitory information storage device, for executing the processor-executable instructions that cause the node to receive, by the processor via the communication interface, a route request message from a source node of the network cluster, determine, by the processor, a proposed routing path between the source node and a destination node based on a comparison of routing node performance metrics stored by the non-transitory information storage device and the one or more routing conditions and send, by the processor via the communication interface, the proposed routing path to the source node for verification of the proposed routing path.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 4 is one embodiment of an authorization event template used in the resource access system shown in FIG. 1;

DETAILED DESCRIPTION

Systems, methods and apparatus are described for authorizing access to resources using distributed ledger technology. An issuing entity generates an authorization event template associated with a resource in control of the issuer and posts it to an authorization blockchain network. The authorization event template comprises one or more conditions under which a resource may be accessed and may additionally comprise one or more permissions that prescribe how the resource may be managed. Traditional access control techniques may be used to determine if a requesting entity is authorized to access the resource and, if so, an authorization record is created based on the authorization event template and an identity of the requesting entity. If all of the conditions listed in the authorization record are satisfied, the requesting entity is granted access to the resource. A "resource", as used herein, comprises any digital computer file in any form, such as a clear or encrypted pdf file, word file, digital photograph or video and audio recordings and real-time transmissions, meta-data pertaining to the resource, an executable file, account information, access to a remotely-executed software application, a stream of data, access to physical objects (i.e., an ability to issue commands or receive data) such as network-connected automobiles, aerial or underwater drones, rockets, military vehicles such as tanks, helicopters, armored personal carriers, submarines, etc. A resource may be stored in a single database or distributed on a network of computers, such as a peer-to-peer network or on a blockchain network.

Figure 1:
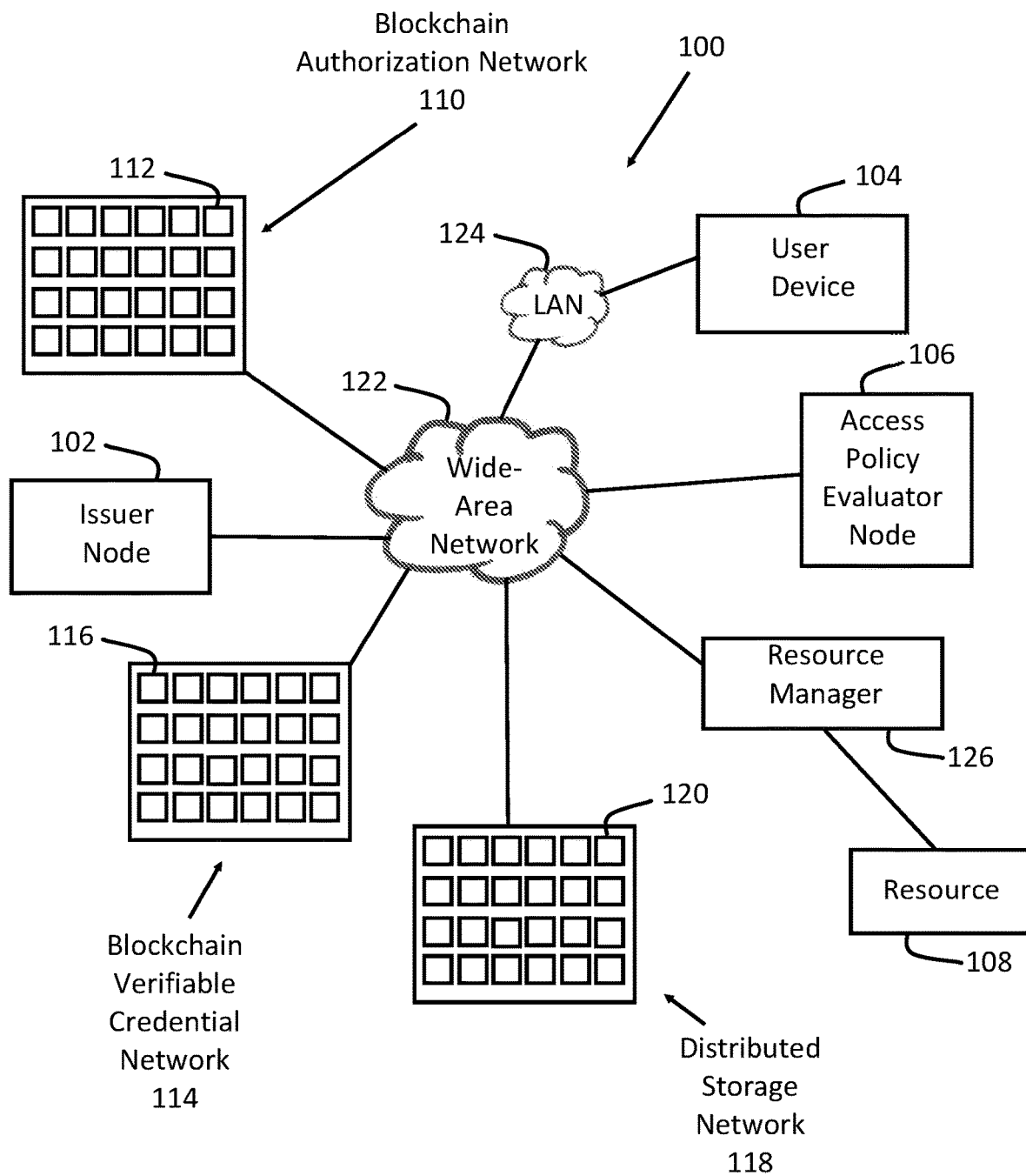
FIG. 1 is a functional block diagram of one embodiment of a resource access system.

FIG. 1 is a functional block diagram of one embodiment of a distributed resource access system 100. Shown is an issuer node 102, a user device 104, an access policy evaluation node 106, a resource 108, a blockchain authorization network 110 comprising a plurality of authorization nodes 112, a blockchain credential verification network 114 comprising a plurality of credential verification nodes 116, a distributed storage network 118 comprising a plurality of storage nodes 120, a wide-area network 122, a local-area network (LAN) 124 and a resource manager 126 A user may access resource 108 by using user device 104. User device 104 is typically a network-capable computer (such as a laptop or desktop computer, tablet, etc.), a computerequipped vehicle such as a car, boat, airplane, helicopter, etc. or a personal mobile communication device (such as a cellular or satellite phone, wearable device, etc.). It should be understood that issuer node 102, user device 104, access policy evaluation node 106, resource 108, authorization nodes 112, and storage nodes 120 may each be referred to herein as a "computing node".

As mentioned above, resource 108 may comprise one of a variety of network-accessible clear or encrypted digital files, remote software applications, clear or encrypted digital information streams, clear or encrypted digital control streams, etc. In some embodiments, access to resource 108 is controlled resource manager 126, which comprises a node such as a computer server that receives requests for resources, evaluates the requests, and provides access to the resources if one or more conditions are satisfied, as will be explained in greater detail below.

Resource 108 may be stored by a single entity, for example, a digital file stored in a single database, or a communication link to a remote vehicle, or, in the case of a digital file, resource 108 may be stored across a distributed storage system such as distributed storage network 118. Distributed storage network 118 may comprise a peer-to-peer network or a blockchain network comprising a plurality of storage nodes. In the case of a blockchain network, each storage node 120 stores an encrypted copy of either a portion or an entire digital file(s) provided by resource 108, and tracks attributes of such files, such as a data and time of creation, modification or storage, an origination identifier describing a resource that generated the file(s), etc. Generally, when a majority of storage nodes 120 agree that valid data has been provided by resource 108, an immutable, linked, cryptographic "block" of data is produced and added to a chain of pre-existing blocks to form a blockchain. A storage node 120 may include the valid data directly in the cryptographic "block", or maintain separate "blocks" whereby one "block" contains the valid data's meta-data and cryptographic signature, and another "block" the actual valid data. The "blocks" may reside on the same blockchain, or on two distinct blockchains, It should be understood that although only one authorization node 112, one credential verification node 116 and one storage node 120 is referenced in blockchain authorization network 110 blockchain credential verification network 114 and distributed storage network 118, respectfully, and that each network is shown having 24 nodes, in practice, a large number of nodes are used for each network, typically in the thousands or even millions.

A "node" or "computing node", as used herein, comprises a networked computing device, for example a computer server or a smart mobile capable of communicating digitally with other nodes via wide-area network 122 and/or a local-area network (LAN) 124. Such computer servers may be hosted in a traditional data center or be part of an embedded edge computing device. Wide-area network 122 comprises a plurality of routing nodes that route signals typically over great distances and among the various nodes of each network, typically comprising the Internet. LAN 124 comprises a computer network that interconnects computers within a limited geographic area, such as a home, a school, an office, etc. A typical example of LAN 124 comprises a Wi-Fi modem/router combination.

Issuer node 102 is responsible for creating an "authorization event template" for each resource to be accessed by users of resource access system 100 and for distributing the authorization event template to all nodes 112 of blockchain authorization network 110. The authorization event template defines "conditions" under which a user may access a particular resource and, in some embodiments, "permissions" that specify how the resource may be managed, i.e., whether a document can be printed, whether the document can be shared with others, etc. The authorization event template typically comprises a unique resource identifier that uniquely identifies the resource in resource access system 100, and one or more conditions that must be true in order for a user(s) to access the resource and, in some embodiments, one or more permissions.

The "conditions" comprise one or more constructs that generally must be true in order for an authorized user to actually access the resource. For example, in a highly classified setting, a user may request an encrypted document from a government database. An authorization event template may have been pre-issued and stored across all nodes 112 of blockchain authorization network 110 in association with the particular encrypted document, the authorization even template comprising one or more conditions in order for the user to view the document. For example, the requested document may have three conditions attached to it, and all three must be true in order for the user to view the document on a screen of user device 104: (1) that user device 104 is a device authorized by the government to view the document, (2) that the user is actually looking at the display screen of user device 104, and (3) user device 104 is accessing the document via an authorized local-area network (i.e., a secure LAN within a particular government office building, for example).

When a user wishes to access a resource using user device 104, the user enters a request into user device 104 to access the resource. The request may comprise a resource identifier that uniquely identifies the resource, and one or more credentials that allow a verifying entity, such as access policy evaluator node 106, to verify that the user is authorized to access the resource. In this example, the request is sent by user device 104 to access policy evaluator node 106 via LAN 124 and wide-area network 122.

When the request is received by access policy evaluator node 106, access policy evaluator node 106 may authenticate the request to determine if it actually originated from the person who purportedly sent the request. Well-known public key encryption techniques may be used to authenticate the user, using a private/public key combination. Once the user is authenticated, access policy evaluator node 106 determines whether the user is authorized to access the resource. This may be accomplished using a number of different techniques, described later herein.

If the user is authenticated and authorized to access the document, access policy evaluator node 106 retrieves the authorization event template stored on blockchain authorization network 110 using the resource ID of the requested resource, and creates an authorization record based on the authorization event template, an identity of the user requesting access to the resource, the resource ID and in some embodiments, a signed token that is used by a user to access a resource. The authorization record contains all of the conditions and permissions that pertain to accessing and managing the resource. The authorization record is stored across all of the nodes 112 of the authorization blockchain network 110 as a verified transaction in accordance with well-known blockchain protocols.

Once the authorization record has been created, access policy evaluator node 106 obtains the a network address, such as a URL, to the resource either directly from resource 108 or from distributed storage network 118, and then provides the authorization record to user device 104. User device 104 then uses the URL to retrieve the resource itself. Alternatively, access policy evaluator node 106 may package the authorization record directly together with the resource. In either case a dedicated encryption key may be applied to the resource for each URL-based or directly packaged access. User device 104 then determines whether the conditions to access the resource are currently being satisfied, such as determining whether user device 104 is authorized to access the resource, determining whether the user is currently looking at a display screen of user device 104, determining an IP address assigned to user device 104 (for purposes of determining whether user device 104 is operating in an authorized local-area network), etc. If all of the conditions listed in the authorization record are satisfied, the resource is provided to the user, i.e., decrypted and displayed on a display screen of user device 104 or otherwise presented in a format that the user may view or hear. If not, the resource is not provided to the user, i.e., not shown on a display screen, not decrypted, etc. If the user wishes to manage the resource, for example, wishes to print a document, store a document on a hard drive or on a removable memory device, play an audio file or audio stream through an audio speaker, display a file or streaming video visually on a display screen or wearable display, etc., user device 104 determines whether the user has permission to do so, based on the authorization record stored in user device 104. If so, user device 104 allows the user to manage the resource. If not, the user is denied permission.

User device 104 may continue to determine whether all of the conditions specified in the authorization record are being satisfied on an ongoing-basis. Generally, if at any time at least one of the conditions are not presently being satisfied, user device 104 may deny further access to the resource, i.e., cease displaying a document, cease streaming audio to a speaker of user device 104, re-encrypt a documents, etc.

Figure 2:
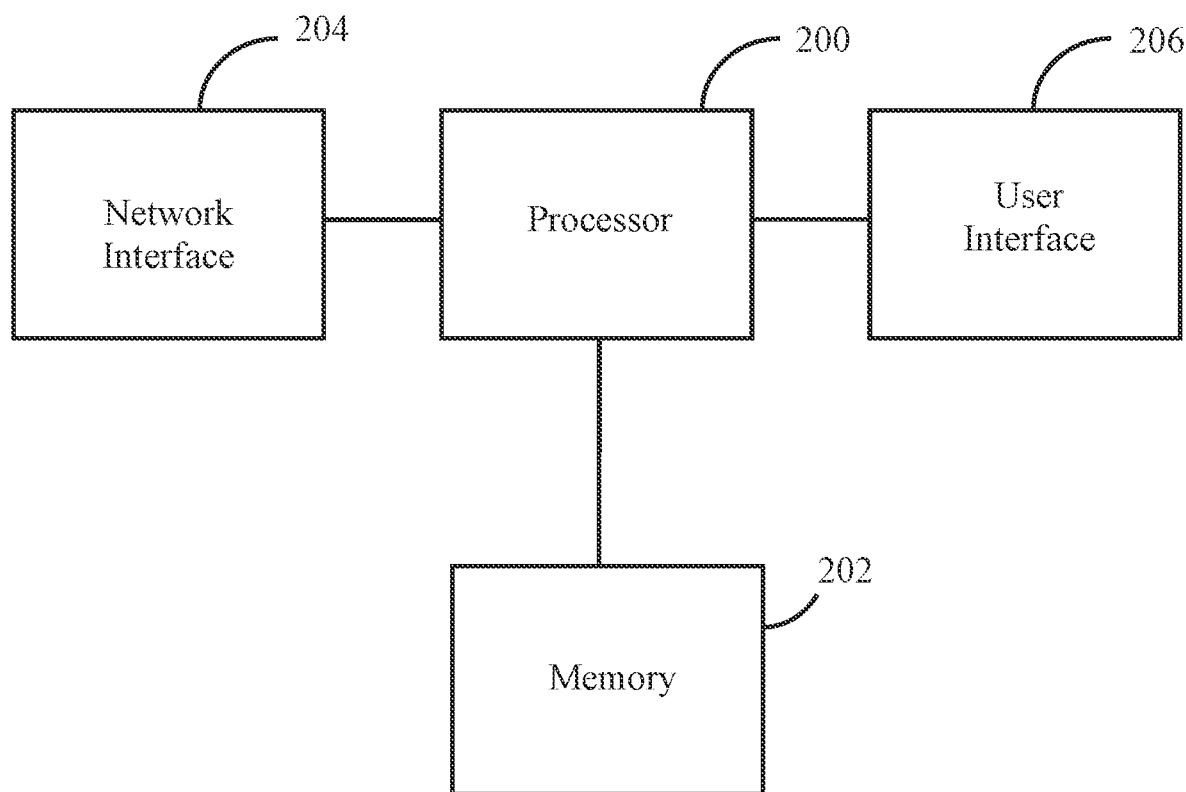
FIG. 2 is a simplified functional block diagram of any of the nodes shown in FIG. 1.

FIG. 2 is a simplified functional block diagram of any of the nodes shown in FIG. 1, comprising processor 200, information storage device 202, network interface 204 and user interface 206 (in some cases).

Processor 200 is configured to provide general operation of each node by executing processor-executable instructions stored in information storage device 202, for example, executable computer code. Processor 200 typically comprises one or more general or specialized microprocessors, microcontrollers, and/or customized ASICs, selected based on computational speed, cost, power consumption, and other factors relevant to each node.

Information storage device 202 is coupled to processor 200 and comprises one or more non-transitory information storage devices, such as static and/or dynamic RAM, ROM, flash memory, or some other type of electronic, optical, or mechanical memory device. Information storage device 202 is used to store processor-executable instructions for operation of each node, respectively. It should be understood that in some embodiments, a portion of information storage device 202 may be embedded into processor 200 and, further, that information storage device 202 excludes propagating signals.

Network interface 204 is coupled to processor 200, comprising circuitry for sending and receiving packetized data to/from other nodes in resource access system 100 via wide-area network 122 and local-area network 124.

User interface 206 is coupled to processor 200 and allows a user to "consume" resources, i.e., to view or listen to resources, and enter various commands, such as control commands to operate a remote, aerial drone, and requests to manage resources, such as requests to print, edit, forward, display, play, render or decrypt resources. User interface 206 may comprise one or more pushbuttons, touchscreen devices, biometric readers, switches, sensors, keypads, and/or microphones that generate electronic signals for use by processor 200 upon initiation by a user. User interface 206 may alternatively, or additionally, comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of resources to a user.

Figure 3A:
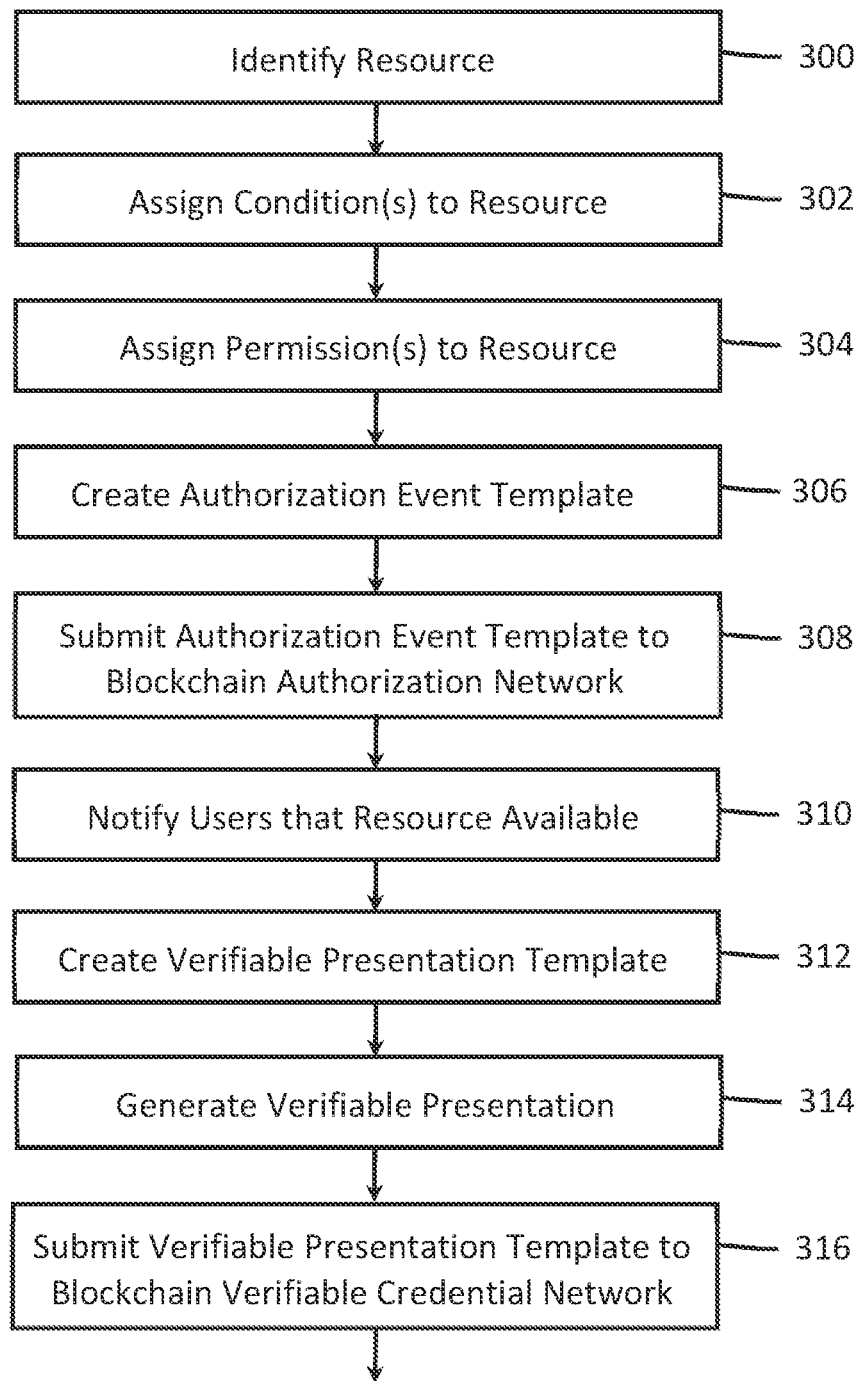
FIGS. 3A and 3B represent a flow diagram illustrating one embodiment of a method, performed by the nodes of the resource access system shown in FIG. 1, for accessing a resource using conditions defined by an authorization record stored on an authorization blockchain network as shown in FIG. 1.
Figure 3B:
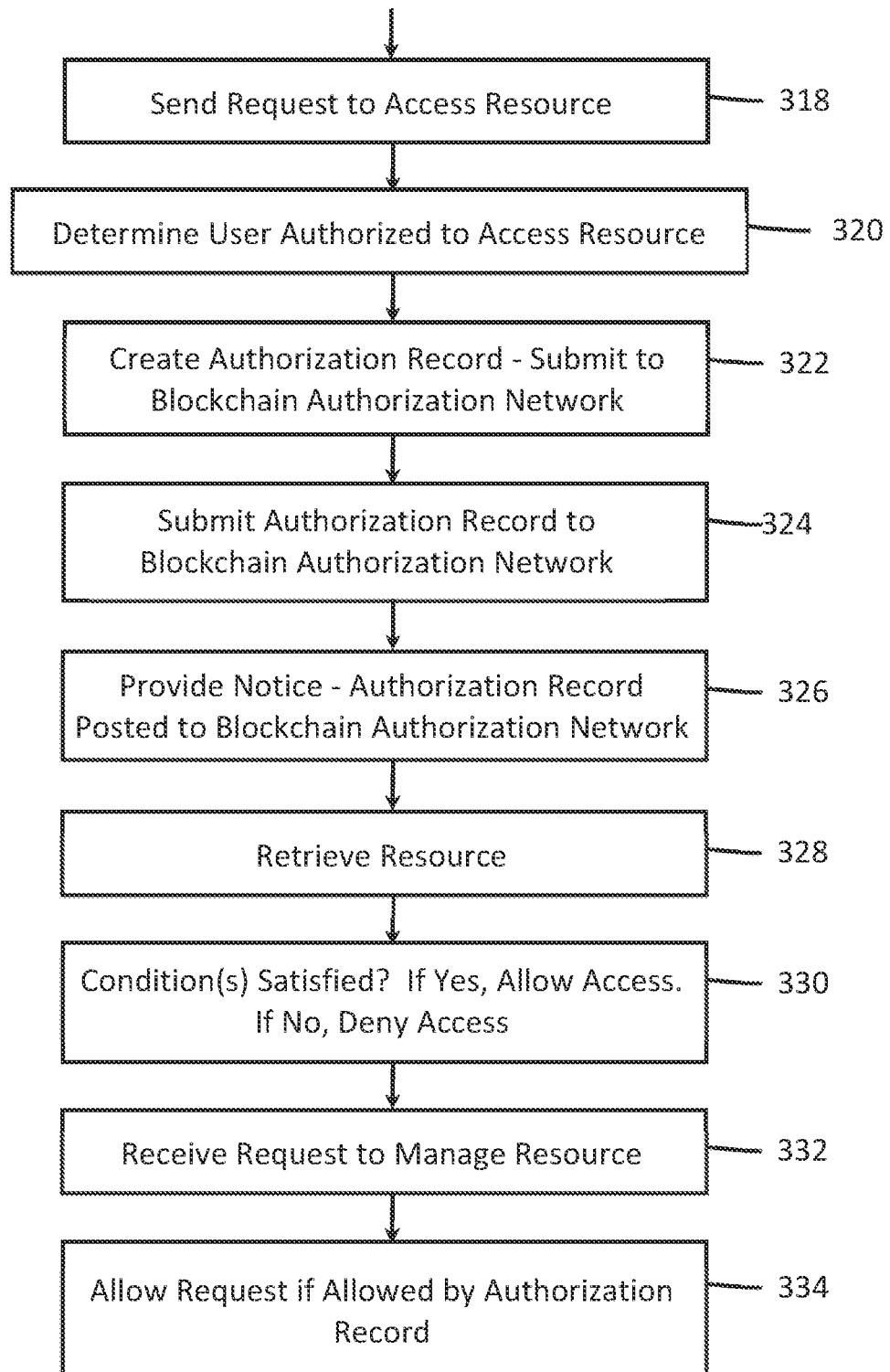

FIG. 3 is a flow diagram illustrating one embodiment of a method, performed by one or more nodes of resource access system 100, for accessing a resource using conditions defined by an authorization record stored on blockchain authorization network 110. More specifically, the method describes operations performed by processor 200 in each node, each executing processor-executable instructions stored in a respective information storage device 202. It should be understood that in some embodiments, not all of the steps shown in FIG. 3 are performed, and that the order in which the steps are carried out may be different in other embodiments. It should be further understood that some minor method steps have been omitted for purposes of clarity.

At block 300, a resource is identified by an "issuer entity", such as a government agency, a health care provider, an insurance company, or some other organization in control of one or more resources. For example, resource 108 may comprise a series of digital photographs or videos, a classified document, a data stream from an aerial drone, etc. Resource 108, in whatever form, may be provided to distributed storage network 118, where it is stored in a plurality of storage nodes 120 in accordance with well-known distributed ledger technology. Generally, the issuer entity is notified after the resource becomes available if the issuer entity did not create the resource. The resource may be assigned a distributed identifier or "DID", which is a unique, cryptographically verifiable, machine-readable code for uniquely identifying the resource in resource access system 100.

At block 302, after the issuer entity is notified of the existence of the resource, and in one embodiment, the DID assigned to the resource, the issuer entity may assign one or more conditions to the resource. For example, the one or more conditions may dictate that user device 104 access the resource over a private satellite communication network only, that user device 104 accesses the file over a public communication network such as a cellular network, a non-secure public satellite communication network, the Internet, etc., that user device 104 is in a pre-authorized location such as a private vs a public place), that a software application for viewing/accessing the file is open, that an expiration time to access the file has not expired, etc. A non-exhaustive listing of conditions that could be imposed on the resource comprise the following:

Access to a Physical File Storage Ledger (Such as Distributed Storage Network 118):
  Access confined to file/directory listings
  Access confined to specific files
  Access confined to encrypted file data
  Access confined to re-encrypted file data with an on-demand key
  Access confined to clear file data
  Transfer of the Data Access confined to one or more local secure private networks (physically separated)

Access confined to one or more local secure private networks (logically separated via encryption)

Access confined to one or more wide-area secure private networks (physically separated)

Access confined to one or more wide-area secure private networks (logically separated via encryption)

Access confined to one or more virtual private networks over non-trusted public network Access confined to one or more network paths (routing) w/o DNS or routing lookups (no digital footprint on 3$^{rd}$ party services)

Access confined to one or more time windows

Access confined to any of the above in conjunction with noise traffic generation, i.e., a purposefully-generated noise floor of useless encrypted data being exchanged ongoingly, so that the real access is not obvious to an observer of the encrypted traffic stream Access confined to any of the above with transmission regulated to sparse bursts, randomized bursts, or continuous bandwidth-regulated transmission, i.e., the timing of transmissions may be prescribed by underlying link capabilities and noise characteristics Consumption of the data (i.e., by user device 104):

One or more identifications of devices authorized to receive and manage a resource One or more identifications of operating systems authorized to run an app for accessing the resource One or more identifications of a level of sandboxing of a consuming application (i.e., one or more operating systems such as Windows or Linux/Mac, one or more browser/web apps, one or more authorized device types, i.e., iOS device, Android device, one or more dedicated virtual machines/dockers to run an app, one or more dedicated hardware nodes to run an app)

One or more identifications of ways to handle data decryption keys (i.e., dedicated secure elements (with specific Common Criteria level), a virtual SE/ARM TrustZone, a dedicated processor, logically or physically separated secure memory)

User Modalities

User auth required (level, how recent, single or two-factor auth, CAC auth (common access card) or other smart card required)

User location (defined by geofence or class of location, e.g. office, home, personal vehicle, public transport, public area)

Time of day windows

User presence (fingerprint every x seconds, face recognition every x seconds, face recognition in conjunctions with continuous video tracking or other gaze detection)

User device handling (motion sensors to discern holding user device 104 vs lying e.g. on a table or in a bag)

At block 304, the issuing entity may assign one or more permissions to the resource, such as whether the user may print a document, whether a user may forward a file to another entity, whether a file can be copied to a physical storage device such as a hard drive, external storage device, removable storage device, whether a document may be converted into another format, such as from Word to a PDF document, whether the resource may be handled by a synchronization service (e.g. iCloud), whether the user may edit a document, whether the user may play an audio file or audio stream through an audio speaker, whether the user may display a file or streaming video visually on a display screen or wearable display, etc.

At block 306, the issuing entity causes an authorization event template to be created in association with the resource. The authorization event template comprises an identification of the resource and an address where the resource may be accessed (i.e., a URL), an identification of one or more users/entities that are authorized to access the resource (in one embodiment, a "realm" is listed, the realm associated with a "tails file" on a distributed identifier (DID) blockchain network in an embodiment where users are grouped into organizations/domains/realms. Each realm has an associated tails file stored on the DID blockchain network that associates users and the resources they can access. In this embodiment, the authorization event template specifies which realms' tails files access policy evaluator node 106 should consider when checking whether a user has access to a resource. While a "tails file" is specific to the Hyperledger Indy implementation, DID chains use signed relationship tables that associate user and resource DIDs), a signed token that is used to access the resource by a requesting entity (such as a person, computer, robot, drone, etc.), the one or more conditions, and in some embodiments, the one or more permissions. The authorization event template may additionally comprise an identification of the issuing entity, an issuance date of the authorization event template, and an expiration date of the authorization event template (i.e., a time/date when the resource may no longer be accessed).

An example of an authorization event template is shown in FIG. 4, which is typically written in a programming and data templating language specific to a blockchain's chain code such as Python, Java, Go, JSON, XML or similar, where line 8 identifies the issuing entity, line 9 identifies an issuance date, line 10 identifies an expiration date of the authorization event template, line 12 identifies the resource (in one embodiment, a DID of the resource), and lines 13-15 lists the conditions and permissions that must be true in order for the entity to access and manage the resource. In this example, in order to access the resource located at "http://ares-customer.com/credentials/3732", a user must be looking at a display screen of user device 104 and the resource may be stored in RAM memory of user device 104 as well as on a hard drive of user device 104 so long as it is encrypted. Line 16 identifies the signed token used to access the resource, as described later herein, identified as "pkNonce".

At block 308, after the authorization event template has been created, the issuing entity submits the authorization event template to one of the nodes 112 of blockchain authorization network 110 via issuer node 102, where it is then provided by node 112 to all of the other nodes 112 of blockchain authorization network 110 in accordance with well-known blockchain protocols. Thus, the authorization event template is stored in a distributed fashion in blockchain authorization network 110 and publicly accessible by any node in resource access system 100.

At block 310, the issuer entity may notify one or more users that a resource associated with the newly-created authorization event template is available by sending a message via wide-area network 122, local-area network 124 to user device 104.

At block 312, the issuer entity may create a verifiable credential template comprising one or more schema, a public key used to identify the issuer entity, and an identification of the verifiable credential template. Verifiable credentials are described by the World Wide Web Consortium ("W3C") (www.w3.org), an international standards organization based in Cambridge Mass.

For example, the schema may comprise one or more fields arranged in accordance with the well-known Indy Anoncreds Specification, JSON Web Tokens, JSON-LD, or some other well-known schema arrangement. For example, the schema may comprise fields for a user name, a clearance level, and a field for a photograph of a user. The public key is part of a private/public key pair generated by the issuer entity used by other nodes in resource access system 100 to verify that the issuer entity is the one who has issued a verifiable credential to a user, and the identity of the verifiable credential template may comprise a distributed identifier, which is a unique alpha-numeric code assigned by the issuer entity that uniquely identifies the verifiable credential template. Distributed identifiers are well known in the art.

At block 314, after the verifiable credential template has been created, the issuing entity submits the verifiable credential template to one of the nodes 116 of blockchain verifiable credential network 114 via issuer node 102, where it is then provided by node 116 to all of the other nodes 116 of verifiable credential network 114 in accordance with well-known blockchain protocols. Thus, the verifiable credential template is stored in a distributed fashion in verifiable credential network 114 and publicly accessible by any node in resource access system 100.

At block 316 the issuer entity may generate a verifiable credential each for one or more users based on the authorization event template and particulars of each user, respectively. For example, the issuer entity may generate a verifiable credential naming John Smith as a user, that John Smith possesses a top-secret security clearance, and a photograph of John Smith. The issuer entity cryptographically signs the verifiable credential with a private key of the issuer's DID and then provides the signed, verifiable credential it to John Smith via wide-area network 122, local-area network 124 (if applicable) and user device 104 where it is stored in memory 202, providing protection against a 3rd party accessing and using the signed, verifiable credential.

At block 318, the issuer entity may create a verifiable presentation template comprising one or more schema, a public key used to identify the issuer entity, and an identification of the subject of the verifiable presentation. In one embodiment, the subject of the verifiable presentation template is the decentralized identity (DID) of the resource, and the verifiable presentation template contents comprise the attributes required by access evaluator 106 to authorize access of the resource to an entity. Verifiable presentations are described by the World Wide Web Consortium ("W3C") (www.w3.org), an international standards organization based in Cambridge Mass.

For example, the verifiable presentation may comprise one or more fields arranged in accordance with the well-known Indy Anoncreds Specification, JSON Web Tokens, JSON-LD, or some other well-known schema arrangement. For example, the verifiable presentation may comprise fields for a user name, a clearance level, and a field for a photograph of a user. The public key is part of a private/public key pair generated by the issuer entity used by other nodes in resource access system 100 to verify that the issuer entity is the one who has issued a verifiable credential to a user which is in turn used to create a verifiable presentation, and the identity of the verifiable presentation subject may comprise a distributed identifier, which is a unique machine-readable and cryptographically verifiable code assigned by the issuer entity that uniquely identifies the verifiable credential subject. Distributed identifiers are well known in the art.

At block 320, after the verifiable presentation template has been created for the resource, the issuing entity submits the verifiable presentation template to one of the nodes 116 of blockchain verifiable credential network 114 via issuer node 102, where it is then provided by node 116 to all of the other nodes 116 of verifiable credential network 114 in accordance with well-known blockchain protocols. Thus, the verifiable presentation template for the resource is stored in a distributed fashion in verifiable credential network 114 and publicly accessible by any node in resource access system 100.

At block 322, the issuer entity may notify one or more users of the existence of the newly-created verifiable presentation template in association with the resource by sending a message via wide-area network 122, local-area network 124 to user device 104.

At block 324 the issuer entity may generate a verifiable credential each for one or more users based on the verifiable credential template and particulars of each user, respectively. For example, the issuer entity may generate a verifiable credential naming John Smith as a user, that John Smith possesses a top-secret security clearance, and a photograph of John Smith. The issuer entity cryptographically signs the verifiable credential with a private key of the issuer's DID and then provides the signed, verifiable credential it to John Smith via wide-area network 122, local-area network 124 (if applicable) and user device 104 where it is stored in memory 202, providing protection against a 3rd party accessing and using the signed, verifiable credential.

At block 326, a user of requesting entity, such as a user of user device 104, a node, etc., requests access to the resource by sending a request to access policy evaluator node 106 via local-area network 124 (if applicable) and wide-area network 122. The request comprises an identification of the requested resource, in one embodiment a DID of the resource, an identity of the user (which may also be a DID assigned to the user), and the verifiable credential of the user. Access policy evaluator node 106 responds with the applicable verifiable presentation template for accessing the resource by this user. Alternatively, the request for access to the resource directly contains the user's verifiable presentation specific to accessing this resource if the required verifiable presentation template is known to the requestor a priori by other means. The verifiable presentation comprises the required attributes from the user's verifiable credential as defined in the resource-specific verifiable presentation template. Verifiable presentations are well-known in the art for allowing nodes such as access policy evaluator node 106 to verify that a requesting entity is authorized to access a requested resource. In this case, the verifiable presentation is created by retrieving the verifiable presentation template stored on blockchain authentication network 110 associated with the requested resource and, based on that template, generate the concrete verifiable presentation, which comprises one or more of the schema data associated with the user, i.e., the user's name, security clearance level, photograph, etc.).

At block 328 access policy evaluator node 106 performs an authorization technique to determine if the user is authorized to access the resource.

A typical authorization technique is to compare a username and password to a list stored by access policy evaluator node 106, to see if the user entered a correct password that matches the user's username. Another well-known technique is to require the user to provide a digital finger print, retinal scan, voice scan, three-dimensional facial recognition, or some other biometric information to user device 104, for user device 104 to match the biometric information to pre-stored biometric information in user device 104. If a match if found, user device 104 may use cryptographic keys (typically asymmetric ones) to generate a token that represents an authorized session, and provide the token to access policy evaluator node 106. However, these prior-art techniques are subject to hacking and data loss, as usernames, passwords, and similar credentials are typically stored on a single server that may be vulnerable to cyber criminals and insider attacks.

However, recent techniques based on blockchain technology have been developed that encrypt such authorization information and allow it to be stored on a distributed ledger, rather than stored and controlled on a server operated by a verifying entity, such access policy evaluator node 106. In this embodiment, the user is authorized using one or more verifiable credentials from a verifiable credentials ledger.

In an embodiment using verifiable credentials, when access policy evaluator node 106 receives the request from the user to access the resource, access policy evaluator node 106 looks up the verifiable presentation template associated with the requested resource on blockchain verifiable credential network 114 and determines that in order to access the requested resource, a user must possess a top-secret security clearance issued by the United States government. Access policy evaluator node 106 can cryptographically determine that the user that requested the resource does, in fact, possess a top-secret clearance based on the information contained in the verifiable presentation template associated with the requested resource using techniques well-known in the art.

In any case, at block 330, after access policy evaluator node 106 determines that the requesting user is authorized to access the resource, access policy evaluator node 106 causes an authorization record to be created based on the authorization event template previously posted to authorization blockchain network 110 in block 308 and an identity of the user requesting access to the resource. The authorization event template is identified by access policy evaluator node 106 on blockchain authorization network using the unique identifier assigned to the resource. The authorization record contains an identification of the resource, an identification of the requestor, all of the conditions and permissions that pertain to accessing and managing the resource, and a signed token for use by the requestor to access the resource for validating the authorization record by nodes 112 of blockchain authorization network 110. The authorization record is then submitted to all of the nodes 112 of the authorization blockchain network 110 after a majority of nodes 112 verify the authorization record in accordance with well-known blockchain protocols.

At block 332, after the authorization record has been posted to authorization blockchain network 110, one of the nodes 112 may provide feedback to access policy evaluator node 106 indicating that the authorization record has been posted as a block of a blockchain managed by authorization blockchain network 110, as well as the authorization record itself.

At block 334, access policy evaluator node 106 may retrieve the resource either directly from resource 108 or from distributed storage network 118. In another embodiment, the resource is referenced by a network address, such as a URL, listed in the authorization record. Access policy, evaluator node 106 may also retrieve the authorization record from authorization blockchain network 110.

At block 336, access policy evaluator node 106 provides the authorization record and in some embodiments, the resource, to user device 104 via wide-area network 122 and local-network 124. The resource may be provided as-is, or protected for this access with additional cryptographic methods for data confidentiality and integrity.

At block 338, one or more nodes of system 100 determines whether the conditions to provide the resource to the requestor are currently being satisfied, such as determining whether user device 104 is authorized to access the resource, determining whether the requestor is currently looking at a display screen of user device 104, determining an IP address assigned to user device 104 (for purposes of determining whether user device 104 is operating in an authorized local-area network), etc. In some cases, one or more of the conditions are verified by one node, and one or more other conditions are verified by one or more different nodes. For example, if the authorization record indicates that the requestor must be looking at the screen and also that the resource may only be provided to one or more identified IP addresses, user device 104 may determine if the requestor is currently looking at a display screen of user device 104, while resource manager 126 may determine if a request to provide the resource comprises one of the one or more identified. IP addresses listed in the authorization record. In one embodiment, each node is provided with a requestor DID and resource DID as the request to access the resource is routed through network 100 from one node to another, from user device 104 to resource manager 126, for example. The DIDs identify an authorization record identified associated with the request that was published to the blockchain authentication network 110 previously. Each node references the conditions in the authorization record (in some embodiments, retrieving and storing the authorization record internally), and evaluates any conditions that are relevant to each particular node in a chain of nodes that are used to deliver the resource. For example, resource manager 126 is responsible for providing the resource from a database, for example, to wide-area network 122, routers of wide-area network 122 are responsible for routing the resource in accordance with well-known networking principles, a router that is part of local-area network 124 is responsible for routing the resource from wide-area network 122 to user device 104, and user device 104 is responsible for receiving the resource from local-area network 124 and providing it to the requestor. Each one of these nodes may need to verify a condition particular to each node. For example, the authorization record may state that the resource may only be accessed when user device 104 is connected to a particular IP address while the user is looking at user device 104. Resource manager 126 and the routers of wide-area network 122 may each determine that an IP address in a resource request received from user device 104 matches the allowed IP address listed in the authorization record for the particular resource being requested, User device 104 determines whether the requestor is currently looking at the display screen. When the conditions listed in the authorization record are satisfied, as determined by each node in the chain of delivery of the resource, is the resource provided to the requestor. In one embodiment, when each node in the chain of delivery verifies one or more conditions listed in the authorization record, each node may report such verification by sending a "transaction" to blockchain authorization network 110, where a smart contract verifies the transaction and is published by all of the nodes 112 of blockchain authorization network 110. When each node has confirmed that the conditions of the authorization record have been satisfied, a block is published that indicates that all of the conditions have been met, and device 104 can access the block to know if it can provide the resource, due to the fact that other nodes have verified one or more conditions not verified by user device 104.

In another embodiment, a single node, such as access policy evaluator node 106, may determines whether all conditions are met, in an embodiment where the resource is routed through the particular node. Upon determination that the conditions have been met, the particular node may publish an indication of such to blockchain authorization network 110, which may execute a smart contract that verifies that the particular node is a valid evaluator. Alternatively, the particular node may provide indications to a smart contract operating on blockchain authorization network 110 whether each condition listed in the authorization record is currently being met, so that the consensus mechanism of blockchain authorization network 110 can ensure that the conditions are being met. In a related embodiment, the particular node may provide indications of only some of the conditions of whether they are being met, while other conditions are verified by other nodes. However, each of the verifying nodes provides one or more indications to the smart contract, and the smart contract verifies when all of the conditions have been met. In another related embodiment, the conditions may be grouped into rules enforceable by a single node each. This eliminates the need to cross-check with all involved nodes whether all conditions are met for the requested access. In this case, before forwarding the resource from one node to another, a sending node evaluates any conditions in the authorization record pertinent to that node, and only if the condition(s) is/are met does the sending node forward the resource to the next node in the chain. This continues from a source node (for example, resource manager 126) to a destination node (for example, user device 104). In this way, when the resource reaches the destination node, it implies that all of the conditions have been met, and the destination node may present the resource to the requestor.

In any case, when all of the conditions listed in the authorization record are satisfied, processor 200 provides the resource to the requestor, i.e., displays a document to the requestor, allows access to a remote web server, allows access to a remote software application, al lows control of a remote vehicle, allows receipt of a data stream from a remote asset, etc. If all of the conditions are not satisfied, processor 200 generally does not provide the resource to the requestor.

At block 340, processor 200 may receive a request from the requestor to manage the resource, for example, a request to print a document, store a document on a hard drive or on a removable memory device, etc. Processor 200 determines whether the requestor has permission to do so, based on the authorization record stored in memory 202 of user device 104. If so, processor 200 al lows the requestor to manage the resource. If not, processor 200 denies the request and generally notifies the requestor.

At block 342, processor 200 may continue to determine whether all of the conditions specified in the authorization record are continuously being satisfied. Generally, if at any time at least one of the conditions are not presently being satisfied, processor may deny further access to the resource, i.e., by blanking the display screen, interrupting a remote networking session, interrupting a data stream, deleting a local copy of a document, etc.

Figure 5:
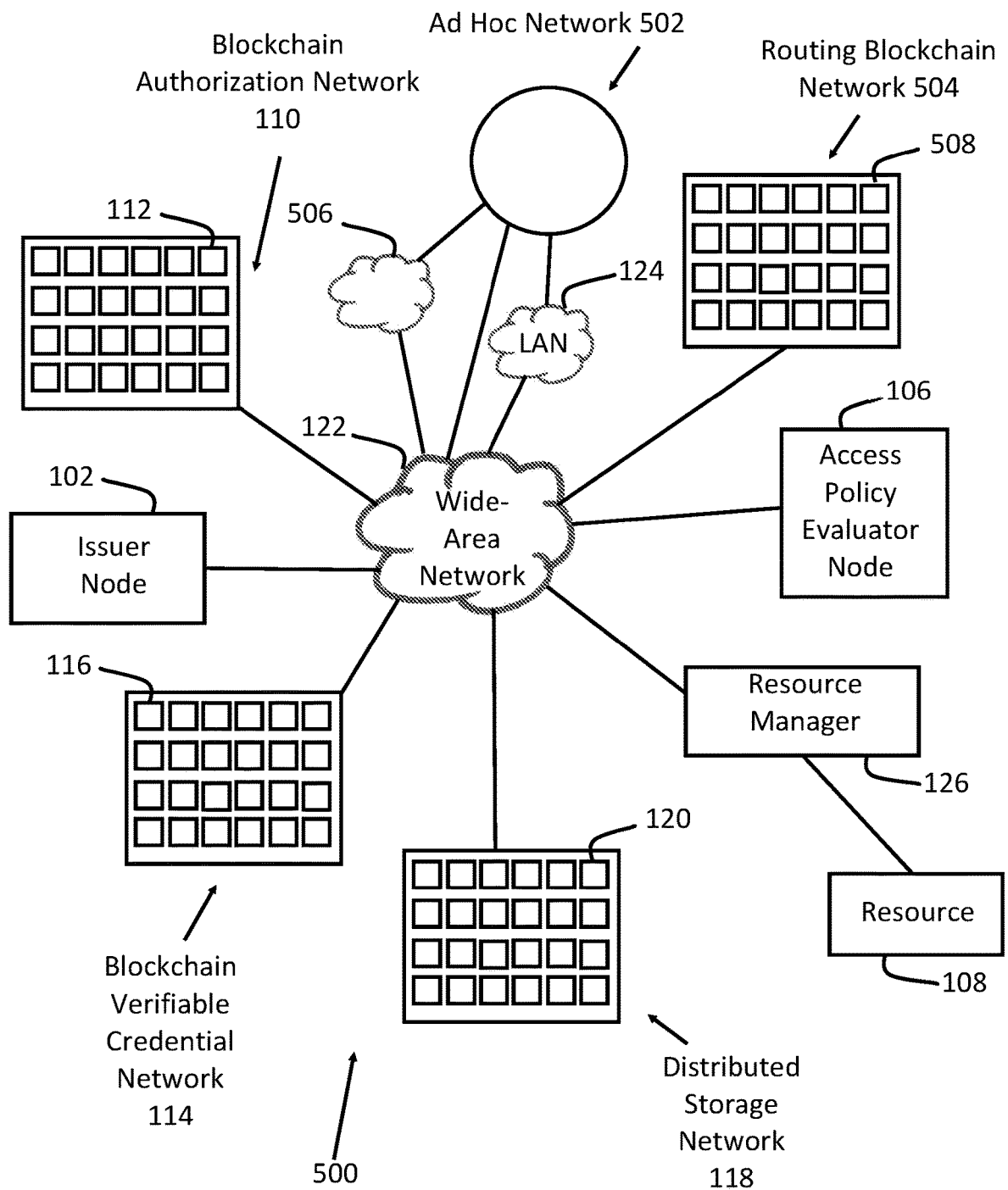
FIG. 5 is a functional block diagram of one embodiment of a system for routing traffic streams in ad-hoc networks.

FIG. 5 is a functional block diagram of one embodiment of a system 500 for routing traffic streams in ad-hoc networks. Many of the functional blocks shown in FIG. 5 are the same or similar to those shown in FIG. 1 and, therefore, a description of their functionality will not be repeated here. New blocks include ad-hoc network 502, routing blockchain network 504 and communication network 506. System 500 comprises a plurality of nodes that may communicate with each other without the need for a centralized or pre-existing infrastructure. Communications between nodes in system 500 in the form of "traffic streams" may be established on an "ad-hoc" basis, i.e., established upon request by one of the nodes. One advantage of system 500 is that it uses distributed ledger technology to define acceptable communication paths between nodes. This enables the creation of virtual private traffic streams as a more granular connectivity and security model than traditional VPNs while still leveraging existing non-trusted network infrastructure. A routing blockchain network is used to validate node performance metrics and routing paths from manager nodes to ensure that routing information is accurate and up-to-date.

System 500 employs a modified architecture of a byzantine fault tolerant (BFT) consensus network (i.e., blockchain network) to more efficiently access routing information and routing node performance metrics in an ad-hoc network. The consensus network is optimized for read access and lookups, not for proposal validation, to accommodate the typical behavior of routing protocols, i.e., routes are typically looked up more frequently than changed. This asymmetric optimization of the consensus networks allows efficient use of a ledger implementation and the associated benefit of protecting against up to $\frac{1}{3}$ of compromised or dysfunctional ledger nodes in a frequent read-access use case.

Routing blockchain network 504 is used to provide the above-described functionality. It supports at least two types of transactions validating routing information and routing node performance metrics provided by manager nodes in system 500, and publishing cryptographic blocks comprising the validated routing information and node performance metrics for future consideration in route discovery processes, generally performed by cluster manager nodes. Traditionally, BFT ledgers require chain code to be executed by all validating nodes of a blockchain to create a new application state as well as to retrieve an application state. This requires that all validating nodes must be in communication with each other at all times, which may not feasible in an ad-hoc network, especially a mobile ad-hoc network. Thus, system 500 provides for distributed ledger verification and publication techniques sometimes using nodes in one or more network clusters, rather than a fixed distributed ledger such as routing blockchain 504, It should be understood that the term "routing blockchain 504" may refer to network 504 as shown in FIG. 1, two or more "ledger nodes" within one more network clusters, or both, as described later herein.

In one embodiment, system 500 may utilize a "localization identifier" when one or more clusters are not able to communicate with routing blockchain network 504. In this embodiment, two or more ledger nodes in a cluster are used to process "routing node information proposals" (i.e., proposed blockchain transactions that comprise routing information and routing node performance metrics, security levels, a performance score for each routing node based on performance metrics of each routing node, and/or other information associated with routing nodes, such as "reachability routes" that define routing paths among member nodes of a cluster and/or between member nodes of different, neighboring clusters), from one or more manager members to determine a new application state applicable to only nodes/clusters identified in a particular localization. An "application state" comprises a current state of routing information and performance metrics for many or all nodes in system 500 in the form of cryptographic blocks generated using distributed ledger techniques. As such, ledger nodes within one or more clusters perform validation of routing information and performance metrics particular to nodes identified as being part of the localization identifier. This results in the nodes in clusters to whom the routing information is most relevant to be the nodes that validate routing node information proposals. The localization identifier is generally included in cryptographic blocks resulting from successful validation of proposals, which allows later synchronization with ledger nodes in a core routing blockchain network, such as routing blockchain network 504, without requiring full ordering across all transactions in all clusters. Further, this facilitates scaling of proposal processing and consensus voting as routing node information proposals are only considered for the locality they, are relevant to and not on a global ledger that may validate transactions for each cluster in system 500.

Routing blockchain network 504 comprises two or more, and generally many more, ledger nodes 508, each for independently validating routing node information proposals from manager nodes in ad-hoc network 502 in accordance with distributed leger techniques. It should be understood that although only one ledger node 508 is referenced in routing blockchain network 504 in FIG. 5, and that routing blockchain network 504 comprises 24 nodes, in practice, a large number of nodes are used, typically in the hundreds, thousands or even millions. However, in one embodiment, the number of ledger nodes 508 comprise a relatively small number, such as less than 50 or even 10, in the case routing nodes within clusters are tasked to perform some or all of the functionality of routing blockchain network 504. In this embodiment, the routing nodes within clusters that perform validation and publication functions may be referred to herein as "ledger nodes". In some embodiments, routing blockchain network 504 comprises only routing nodes in a network cluster (where each routing node may perform proposal validation as well as traffic routing functions), in situations where none of the member nodes of a cluster are able to communicate with routing blockchain network 504. In yet other embodiments, routing blockchain network 504 may comprise a combination of ledger nodes 508 and one or more routing nodes of one or more network clusters.

Nodes within ad-hoc network 502 may communicate with any of the four blockchain networks shown in FIG. 5 directly or indirectly via one or more wide area networks 122 and/or 506, such as one or more cellular communication networks, satellite communication networks, land-based communication networks (such as the Internet), or some other communication network. In some embodiments, one or more nodes in ad-hoc network 502 communicate with one or more of the wide-area networks shown in FIG. 5 via an intermediary network, such as local-area network (LAN) 124. In some cases, the communications between nodes and the blockchain networks may be temporary or fleeting in the case of some nodes being mobile, coming in and out of range of one or more of the blockchain networks as the mobile nodes move.

A "node" or "computing node", as used herein, comprises a fixed or mobile electronic device with networking capability, such as a desktop computer, a tablet or laptop computer, a mobile phone, a router, a computer server, etc. capable of communicating digitally with other nodes via wide-area network 122/506, LAN, and/or other close-range area networks like PANS (Personal Area. Networks) 124. Computer servers may be hosted in a traditional data center or be part of an embedded edge computing device. A "routing node", as used herein, is a node that is configured to forward digital messages, typically in the form of data packets, from one node to another node. A "ledger node" is a node that at least validates routing node information proposals and, in some embodiment, also forwards, or routes, traffic between nodes.

Figure 6:
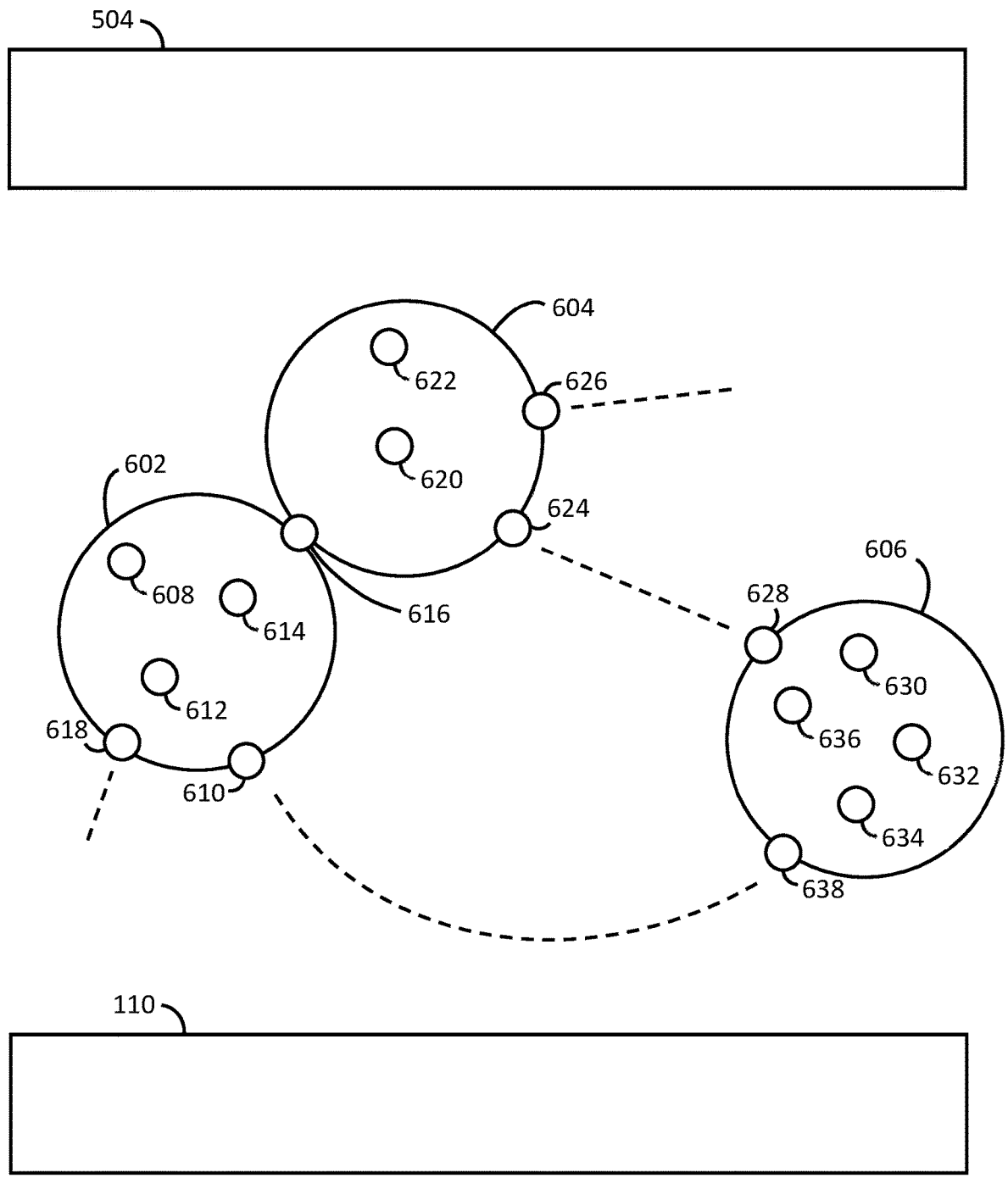
FIG. 6 is a functional block diagram of one embodiment of a portion of the system shown in FIG. 5, illustrating the ad-hoc network of FIG. 5 in more detail, as well as an authentication blockchain network as shown in FIG. 1 and a routing blockchain network as shown in FIG. 5.

FIG. 6 is a functional block diagram of one embodiment of a portion of system 500, illustrating ad-hoc network 502 in more detail, as well as authentication blockchain network 110 and routing blockchain network 504. Not shown, for purposes of clarity, are the other elements of system 500 of FIG. 5. Ad-hoc network 502 is shown comprising network clusters 602, 604 and 606. Each network cluster comprises one or more nodes (nodes that have been accepted by a respective manager node as part of a cluster managed by the manager node may be referred to herein as "member nodes"). Cluster 602 comprises nodes 608-618, cluster 604 comprises nodes 618-626 and cluster 606 comprises nodes 628-638. Note that node 616 is common to both cluster 602 and 604. One or more nodes in each of the clusters may comprise a routing node, defined earlier, while one or more other nodes may comprise "end nodes" that do not forward network traffic from one node to another node. Other nodes may comprise ledger nodes, specifically deployed to validate routing node information proposals locally within a cluster or two or more clusters. As mentioned earlier, a routing node may also be configured to act as a ledger node.

Clusters are logical groups of nodes that share one or more of proximity metrics, described later herein. Nodes can be members of different clusters based on different sets of proximity criteria as determined by a member node of each cluster, including simultaneously being a member of multiple clusters, where each cluster may have different proximity criteria from each other. Nodes may be configured as a manager node, a routing node, an end node or a ledger node. A manager node is responsible for granting and revoking membership in a cluster, assigning unique node identification codes (NIDs) to nodes within the cluster, determining connectivity information for each member node (i.e., a listing of nodes in communication with each particular node, for determining routing paths between nodes, described later herein), tracking, storing and/or determining of routing node performance metrics and security levels of each member node, storing a list of routing node pairs that provide connectivity to each other in different clusters (i.e., outside a particular cluster) via a same link type (i.e., a satellite link for linking two nodes in different clusters)), storing neighbor cluster information, such as an identity of one or more neighbor manager nodes and each manager node's routing information, i.e., a list of nodes managed by the one or more neighbor manager nodes including each routing node's performance metrics, security levels, connectivity information, etc., and a listing of external networks that at least some of the routing nodes can connect to. A routing node comprises at least two active or dormant but available communication interfaces (such as cellular, satellite, Bluetooth, etc.) and the ability to forward traffic between these interfaces and to other nodes according to configurable rules. An end node comprises at least one active or available communication interface capable of a primary link type of a cluster (i.e., a Wi-Fi interface when a cluster's primary link type is Wi-Fi), but generally is not configured to forward traffic to other nodes. A cluster may contain multiple routing members, end nodes and ledger nodes, but generally only a single manager node. Note that a manager node may be configured to act as a routing node, ledger node and a manager node, in some embodiment.

A member node (including the cluster manager and any manager candidate nodes) fulfills proximity criteria of the cluster following a "cluster profile" relative to the cluster based on fit and time, Prior to joining a cluster, a "vagabond node" may be assessed by a manager node to determine if the vagabond node's proximity characteristics allow entry as a member to a cluster. A manager node may calculate an overall "proximity score" that is "high" when a vagabond node fits well into a cluster's profile, and "low" when a node does not:

mobility-score=(fit-bias×proximity-fit)×(longevity-bias×proximity-longevity)

Any node can be characterized by a manager node by how well it fits the cluster's proximity criteria in the cluster profile at a current moment, and/or and how likely it is to maintain that fit over a meaningful period of time, such as an hour, a day, etc. Different cluster policies may value current/future fit versus longevity differently to determine the highest mobility score and thus the best manager node based on things such as the cost of switching between manager nodes, the availability of alternate manager candidates, and the impact of switching the manager during ongoing traffic streams.

Manager nodes, routing nodes and end nodes may act as clients accessing other services or as servers providing functionality to other clients. The service and application level role of a node of any type is typically not related to or bound by its role within a cluster.

If a cluster solely consists of nodes with only one active or available communication interface, it may be referred to as a cohesive cluster. Such cluster is fully functional within, but it cannot connect to the outside world and is generally invisible to any other clusters. Upon the direction of a manager node, a non-cohesive cluster may disable all routing nodes' external interfaces to become cohesive.

Referring back now to FIG. 6, as an illustrative example, duster 602 may comprise a mix of end nodes, routing nodes and a manager node, each of the nodes using Wi-Fi as a common link type among them, where the "edge nodes" may comprise embedded and personal devices (such as cellular or satellite phones, also capable of local communications with other nodes within the same cluster) on a boat in coastal waters. For example, the boat may comprise an Iridium satcom modem with a Wi-Fi access point (node 610), and a passenger may carry a personal mobile phone (node 618), capable of both Wi-Fi and cellular communications) that is within coverage of a coastal cellular network. A crew member of the boat may carry a system monitoring tablet (node 616) that is also part of cluster 604, cluster 604 comprising a number of Bluetooth Low Energy (BLE) environmental sensors and a manager node. Yet another crew member uses a mobile phone (node 626) to also connect to the BLE sensors via BLE. In this example, nodes 618, 610, 616, and 624 are routing nodes, and nodes 614 and 620 are manager nodes of clusters 602 and 604, respectively. As close neighbors in physical proximity, manager nodes 614 and 620 may pro-actively exchange their routing tables with each other. Each routing table may comprise routing paths between two nodes, node performance metrics, security levels, and performance scores for each routing node.

Separately, cluster 606 represents a helicopter that carries an Iridium satcom modem with a Wi-Fi access point (node 638), and a cellular modem (node 628) for cellular communications with node 624. Various computing nodes on board the helicopter are connected via the Wi-Fi access point, and node 634 is the active manager of the cluster.

The nodes in dusters 602 and 606 choose between external cellular and satcom data links based on coverage, cost, and confidentiality.

As the boat with clusters 602 and 604 and the helicopter with cluster 606 approach each other during a mission and the helicopter maintains a constant altitude and relative distance and bearing to the boat, sufficient Wi-Fi coverage from the boat may allow nodes 630-638 to temporarily also join cluster 602 in addition to their membership in cluster 606. In this case, node 614 may manage the extended group of nodes in cluster 602 and cluster 606.

Within each cluster, a manager node maintains routing information, in one embodiment in the form of a routing table, on behalf of its members. For example, node 614 may be the manager for cluster 602, node 620 may be the manager node for cluster 606 and node 634 may be the manager node for cluster 606. The term "routing table", as used herein, refers to any form or arrangement of node information stored by a manager node and not necessarily in table form. Each manager node may proactively ping it's member nodes to determine the most up-to-date routing information pertaining to the member nodes, in order to maintain a close-to-real-time connection status with each member node. The frequency of this proactive connection monitoring may depend on a primary link type used within the cluster, e.g. a high frequency may be used over a Wi-Fi network, whereas a group of nodes connected via a cellular or satcom link may use a lower pinging frequency.

Each manager node may additionally maintain an identification of neighbor managers and their associated neighbor clusters, that are in proximity to each manager node, as well as neighbor nodes (i.e., nodes in a neighboring cluster) having active traffic between two associated clusters. Generally, when a manager's routing table changes, it shares the updated table with its neighboring managers. This allows a near-real-time depiction of each cluster, and a high probability of each managers' routing table to be correct. Frequent interactions are unlikely to incur the latency of an on-demand based reactive ad-hoc network, and tiering the proactive monitoring within clusters and between managers of neighboring clusters limits the amount of pinging traffic caused in traditional proactive ad-hoc networks.

Manager nodes may determine whether two nodes in are in proximity to each other for establishing candidate nodes and routing paths for future communications, i.e. a series of nodes that are in communication with each other, and also comprise similar routing capabilities, forming a "path" from a source node to a destination node. The criteria by which two nodes are in determined to be "in proximity" to each other comprise one or more of the following: a physical proximity between two nodes, (either in absolute position or relative position and velocity terms), link proximity (i.e., an efficiency, quality, and/or longevity of one or more past and/or present communications), a quality-of-service (QoS) proximity (i.e., an ability to provide one or more equivalent predetermined QoS metrics during communications with other nodes, a security proximity (i.e., one or more equivalent security levels assigned to a node in association with a particular manner of communication), a confidentiality proximity (i.e., an ability to provide an equivalent specific minimum encryption of a stream), and an observability proximity (i.e., a metric describing how well a node utilizes noise or other techniques to equivalently mask a stream from being observed by an unauthorized entity). Two or more of these "proximity metrics" may align (e.g. a person walking with a phone and a smart watch yielding absolute, relative and link proximity) or diverge (e.g., two laptop computers connected on a public network may have close absolute and relative physical proximity, but no observability proximity when at least one of the laptops do not mask its transmissions with noise). One or more of the above proximity metrics may also be referred to herein as "performance metrics" or "performance characteristics". In one embodiment, the QoS metric may comprise an aggregate weighting of a communication link bandwidth, a communication link latency, a communication link jitter and/or a communication link cost per data unit or over time.

The observability metric mentioned above may apply to the activity of a routing node, such as a number or rate of packets forwarded by a routing node, a packet size distribution by a routing node, a network equipment system load, a power consumption of a routing node, a thermal footprint of a routing node, logging activity of a routing node, and/or an on-demand link activity versus dormancy of a routing node, Ideally, all routing nodes in a routing path requiring obscurity are able to exchange information with each other without impacting any of the above observability metrics. The activity of a routing node may be obscured using one or more techniques, such as utilization of fully private links (i.e., each routing node in a routing path is not physically, observable, e.g. on a secure campus), maintaining a constant transmission power/level consisting of traffic embedded within a continuous noise signal, maintaining a specific network traffic pattern that is indistinguishable from other activities, e.g. periodic bursts of data, in which actual transmissions are embedded, or by utilizing vendor data fields in regular network management protocols to masquerade traffic.

Figure 7:
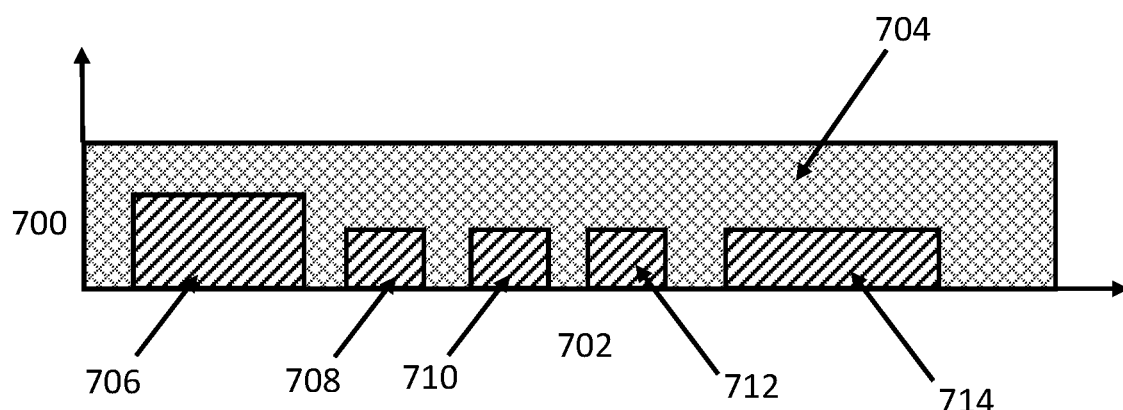
FIG. 7 is a graph illustrating a continuous transmission power/level vs. time in one embodiment for obfuscating traffic with noise.
Figure 8:
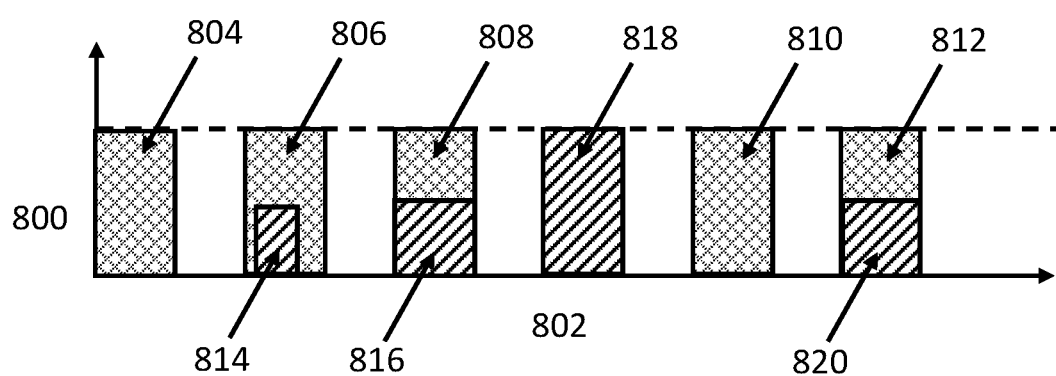
FIG. 8 is a graph illustrating another embodiment using burst noise to obfuscate traffic.

FIG. 7 is a graph illustrating a continuous transmission power/level 700 vs. time 702 in one embodiment for obfuscating traffic with noise, while FIG. 8 is a graph illustrating another embodiment using burst noise to obfuscate traffic. In FIG. 7, noise is shown as reference numeral 704 while traffic is shown as reference numerals 706-714, and in FIG. 8, reference numeral 800 denotes a transmission power/level, reference numeral 802 denotes time, and reference numerals 804-812 while traffic is shown as reference numerals 814-820. In the embodiment shown by FIG. 7, a routing node may transmit a signal at a constant power level, the signal comprising all noise, all traffic, or a combination of noise and traffic. In the embodiment shown in FIG. 8, a routing node may transmit signal bursts as shown, each burst comprising all noise, all traffic, or a combination of traffic and noise. Combining noise and traffic is well known in the art.

Each routing node along a routing path may store a set of available noise profiles for each of a routing node's links/interface types. For example, a noise profile may dictate that only burst obfuscation be used when communicating over a satellite link, while continuous noise obfuscation be used while operating over any other link type. Of course, an overall latency of the traffic may be limited using burst obfuscation by a time equal to a time between bursts. In another example, a noise profile may determine whether real-time transmissions such as a live video stream can be supported, or whether only delayed transmissions can be expected between two nodes.

A noise profile may also specify what type of obfuscation (either continuous or burst) should be used depending on the type of traffic being transmitted. For example, bulk data transfers and RTP video transmissions may require only continuous obfuscation while network management messages may use either continuous or burst obfuscation.

Further, a noise profile may comprise a dormancy timer that forces a routing node to perform one or more functions when it is not transmitting traffic, or "dormant". For example, a noise profile may comprise a dormancy timer equal to 3 seconds, and when a routing node is dormant for more than 3 seconds, it will begin transmitting noise to obfuscate the beginning of a next traffic transmission. Similarly, a noise profile may comprise a keep-alive timer that forces a routing node to maintain noise traffic for a specified minimum duration after the last traffic transmission.

Noise profiles may be generated by the issuer entity and either included in a DID specifying a class of traffic streams (i.e., a "secure" communication, a "top-secret" communication, etc.), or as part of one or more conditions of a specific authorization event. In the former case, an authorization event may refer to the DID identifying a particular stream class and in the latter, the authorization event directly lists one or more conditions related to a capability of a node to use particular obfuscation methods using noise or other means of embedding information in regularly observed traffic patterns.

Each node may be assigned a node identification code ("NM") by an associated manager node that uniquely identifies each node in a cluster (or, in some embodiment, unique to system 500) stored in association with each node, respectively, in the routing table managed and stored by the manager node. The NID is used by nodes to route data packets to other nodes at the routing level, i.e., a source node may be assigned one NID while a destination node may be assigned a different NID, and all nodes that form a communication path between the source node and the destination node also each assigned a unique MD for a particular communication session, or for all communications. NIDs may be assigned by a manager node upon an ad-hoc request to establish communications, when a node joins a cluster, or in response to some other event. In one embodiment, the NID comprises a 256-bit identifier that is based on an HMAC-256 of the node's permanent hardware identification code (such as a MAC address), and a membership session secret created by the manager node when a node first becomes a member of a cluster. In cryptography, an HMAC (sometimes referred to as either a keyed-hash message authentication code or a hash-based message authentication code) is a specific type of message authentication code (MAC) involving a cryptographic hash function and a secret cryptographic key. As with any MAC, it may be used to simultaneously verify both data integrity and authenticity of a message. HMAC can provide message authentication using a shared secret instead of using digital signatures with asymmetric cryptography. It trades off the need for a complex public key infrastructure by delegating the key exchange to nodes that are responsible for establishing and using a trusted channel to agree on the key prior to communication. In one embodiment, system 500 enables two key functionalities: 1) only immediate link-peers (i.e., nodes in direct communication with each other) need to know a node's identifying permanent address, and IP address assignments can happen independently of a node's stream establishment.

In one embodiment, each node is assigned a security level in accordance with its functionality and its ability to support various QoS types, including the QoS metric based on observability. In one embodiment five security levels are defined:

Level 0—Public untrusted nodes

Level 1—Public untrusted nodes with some QoS functionality and vulnerabilities typical for commercial networking infrastructure Level 2—Authenticated nodes with verifiable credentials and reliable QoS functionality Level 3—Authenticated nodes with level 2 features and the ability to maintain confidentiality, i.e. providing transport layer security endpoints or CEK management to encrypt/re-encrypt traffic streams Level 4—Authenticated nodes with level 3 features and the ability to minimize stream observability through active obfuscation Security levels typically have a corresponding set of domains stored on blockchain verifiable credential network 114, i.e., a DID may be defined for each security level. A node is generally configured to route traffic requiring a certain security level or lower. A routing node is also generally configured to route multiple streams of traffic simultaneously based on each stream's DID domain and associated security requirements, as specified in an authorization event template created by issuer node 102 and stored in blockchain authorization network 110.

As described earlier herein, issuer node 102 generates an authorization event template associated with a resource, or "stream", in control of the issuer and posts it to blockchain authorization network HO. The authorization event template comprises conditions and permissions in order for a node to access a resource. It may also provide an identity of a destination node, such as a DID, that is coupled to the resource. In particular, the conditions may comprise one or more of the example conditions listed above under "Transfer of the data", i.e., routing conditions applicable to routing nodes of system 500 that route a particular traffic stream related to the resource associated with the authorization event.

Generally, nodes in system 500 may retrieve an authorization event from blockchain authentication network 110 associated with a particular resource of interest, either before requesting access to such resource or sometime prior to such a request. This process is similar to how user device 104 is provided with an authorization event as described earlier herein. However, the conditions listed in the authorization event include routing conditions in addition to any other data handling conditions as described earlier. The routing conditions are applicable to routing nodes in system 500 needed to forward traffic during communication/access with/to a resource. For example, in order to establish a communication with a resource located in a foreign country, the authorization event may specify that communications between a source node and the resource must be routed through a satellite network and then through a secure network located at a particular secure facility, and that every router in a communication path from the node in the foreign country to the source node must operate with a security level of at least level 3.

When a node requests access to a resource (i.e., a "source node") the node sends a request to a manager node within a cluster where the requesting node is a member (either directly or indirectly via one or more routing nodes), the request comprising an identification of the source node and, an identification of the resource and/or destination node where the resource may be accessed, and the routing conditions listed in the authorization event already received by the requesting node and associated with the particular resource being requested. The manager node receives the request and determines a proposed routing path comprising a listing of routing nodes that can route traffic between the requesting node and a destination node that is coupled to the resource. The proposed routing solution is based on the routing conditions and the presently-stored state of node information and connectivity listed in the manager node's routing table. Based on the age of the routing table (for example, more than one hour), or more specifically, the last time that the routing table was updated that includes potential routing nodes in a proposed routing path, the manager node may ping these nodes to verify that they are still valid from a connectivity perspective and update its routing table accordingly. If the manager nodes finds it has insufficient routing table information to build a complete routing path it may query other neighboring manager nodes to discover routing options not yet described by its own routing tables. Then, the manager node determines the proposed routing path and sends it to the requesting node. The requesting node, in response, pings the destination node by providing a route verification message to the first node in the proposed routing path, where it is then routed from routing node to routing node along the path, either inside and/or outside of the cluster, until the route verification message reaches the destination node. The destination node sends confirmation of receiving the route verification message back through the same set of routing nodes that routed the message. Each routing node in the path between the requesting node and the destination node digitally signs the response, thus creating a fully verified path when the response reaches the requesting node. Once the path has been verified in this manner, the requesting and destination nodes may begin communications with each other, allowing access to the resource. In one embodiment, the response generated by the destination node comprises a nonce, encrypted with key material only known to the requesting node. This allows the requesting and destination node to establish a secret cryptographic seed for further derived encryption or authentication keys for use during communications.

As mentioned previously, the manager node stores performance metrics associated with each member routing node in its cluster. The manager node may determine such performance characteristics based on past communication performance by its member routing nodes, as each node generally tracks one or more communication metrics, such as data throughput rate, latency, jitter, reliability and predictability based on down-time, noise characteristics, and its adherence to the transmission constraints associated with individual streams. Alternatively, or in addition, each routing node of a cluster may provide packet forwarding activities to a manager node, which may comprise an "uptime" of one or more communication interfaces (i.e., Wi-Fi, satellite interface, cellular interface, etc.), a number of traffic streams that are active, processing load/system utilization metrics, security alerts, system resource quota events, a number of packets processed/forwarded, data sizes processed/forwarded, and/or measured latencies, bandwidth, and/or jitter between ingress and egress for each traffic service class (i.e., a particular QoS requirement). In other embodiments, manager nodes determine routing node performance metrics proactively, i.e., by requesting that routing nodes perform a communication, and measuring the performance of each node during the communication. In any case, the performance metrics of the nodes are stored in a routing table of each manager node.

Performance metrics for each member routing node are periodically formulated into cryptographically-signed routing node information proposals in accordance with distributed ledger techniques. Such signed proposals may be associated with different trust levels based on cryptographic keys used to sign the proposal. For example, a routing node information proposal from a commercial router may be trusted less in a blockchain network's validation process than a proposal from a secure router employing a smartcard-based signature with a hardened implementation of a key store and signature generation. Upon submission to routing blockchain network 504, or to ledger nodes within one or more clusters (for example, when two or more clusters are in physical proximity to each other, and/or moving at the same velocity, etc.), each routing node information proposal is validated, again using distributed ledger techniques, and a cryptographic block is published comprising a number of validated proposals. In one embodiment, a smart contract is executed by routing blockchain network 504 or cluster ledger nodes, that calculates an overall performance score for each routing node, and in one embodiment, multiple scores, one for each of the nodes' supported security levels. The performance score is a verifiable, long-term reputational score for each routing node which can be used by manager nodes when, for example, a new routing node joins a cluster and the new routing node's performance characteristics are not known yet. The routing score represents an overall, single metric that describes the performance of each node. For example, the routing score may range from 0 to 10 based on the formula described above (i.e., mobility-score=(fit-bias×proximity-fit)×(longevity-bias×proximity-longevity) whereby the biases are defined per the cluster policy the routing node is a member of, where 0 indicates that a node is out of commission and a 10 indicates that a node is operating normally, able to route traffic at a data rate exceeding a predetermined, high data rate, and that a packet error rate experienced by a node is less than a predetermined minimum packet error rate. The routing scores may be published as a separate cryptographic block separately from the cryptographic block containing the routing metrics, or it may be included as one of the performance metrics and published along with the performance data in a cryptographic block. Manager nodes may retrieve public cryptographic blocks from routing blockchain network 504, or from local ledger nodes, and update their routing tables in accordance with the information in the cryptographic blocks.

Routing blockchain network 504, or local ledger nodes, may operate on a concept of rewarding routing activity with a good performance score, i.e., a reward (i.e., a higher performance score) is based on a routing node's performance and not its computational effort as in proof-of-work blockchains. In this way, a routing node's performance (and hence trustworthiness and reliability) is memorialized in metrics meaningful to a DID issuing domain (i.e., an issuer entity) on a distributed ledger (routing blockchain network 504, or local ledger nodes) by consensus and thus minimizing the computational overhead of such a distributed performance scoring system.

The performance metrics, including performance scores, are used by a manager node to establish a reliability-score for each routing node and to update the metrics/score over time as new performance information is received via new cryptographic blocks and/or determined by each manager node, as discussed previously. In some embodiments, when a routing node joins a cluster, a manager node may use the routing node's previously-published performance metrics, and/or reliability score as determined by a different manager node of a different cluster after previous communications involving the new routing node, and/or performance metrics/scores as published by routing blockchain network 504, or local ledger nodes, to establish its initial weight when being added to a manager's routing table.

Figure 9:
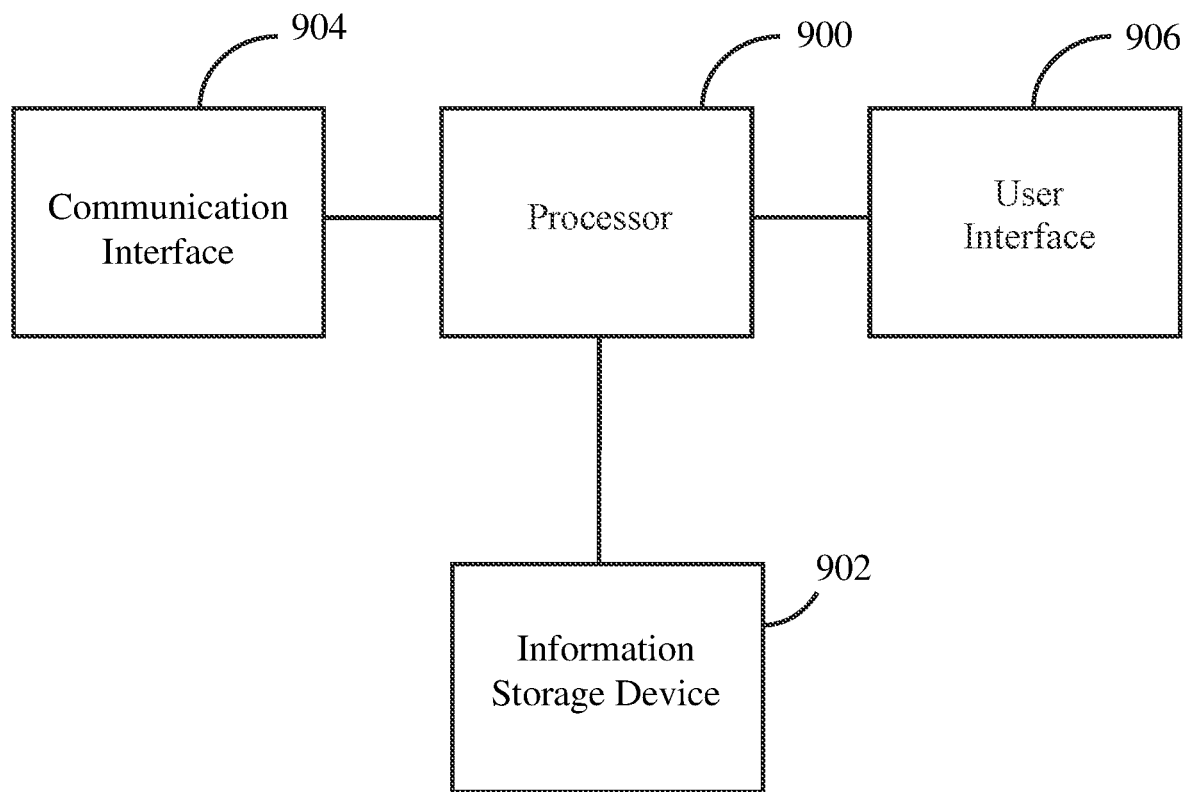
FIG. 9 is a functional block diagram of one embodiment of one of the nodes shown in FIG. 6.
Figure 10A:
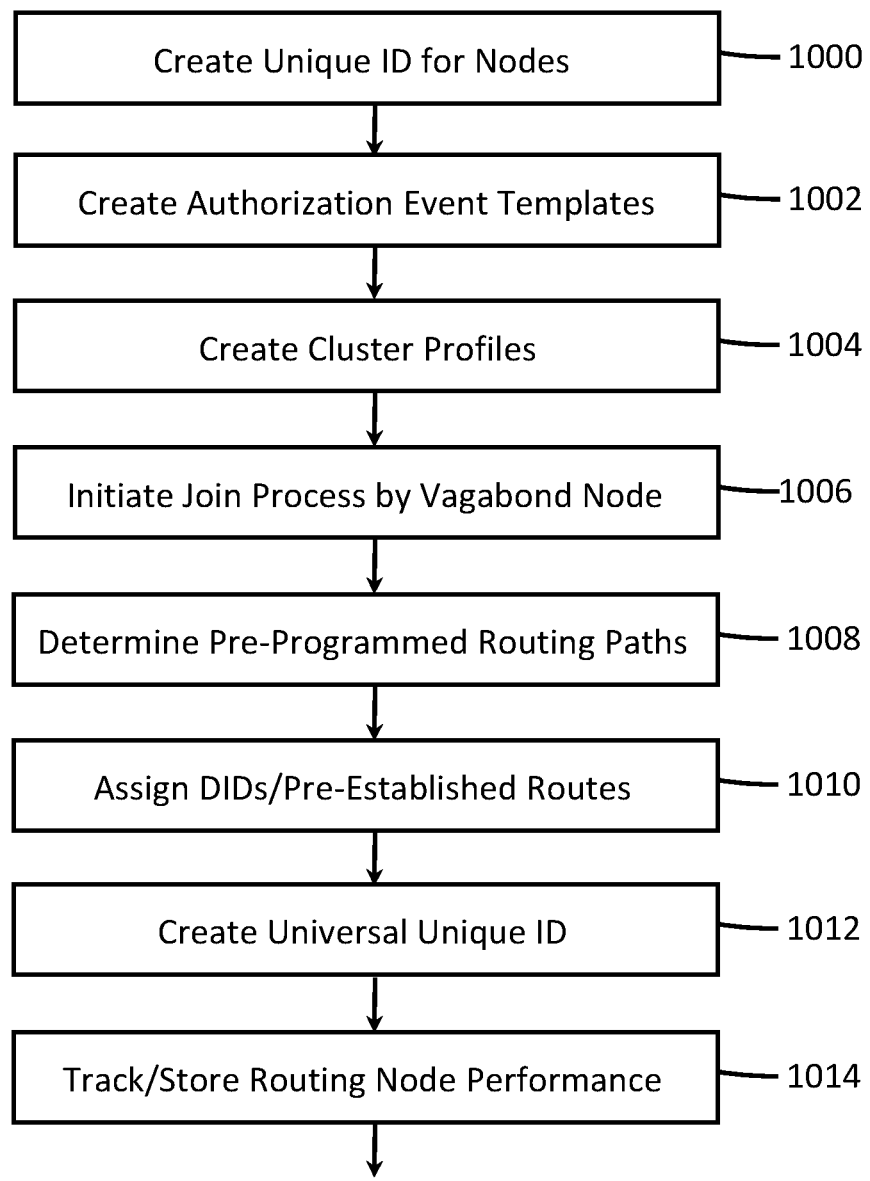
FIGS. 10A-10D represent a flow diagram illustrating one embodiment of a method, performed by one or more nodes of the system as shown in FIG. 5, for routing traffic streams in ad-hoc networks.
Figure 10B:
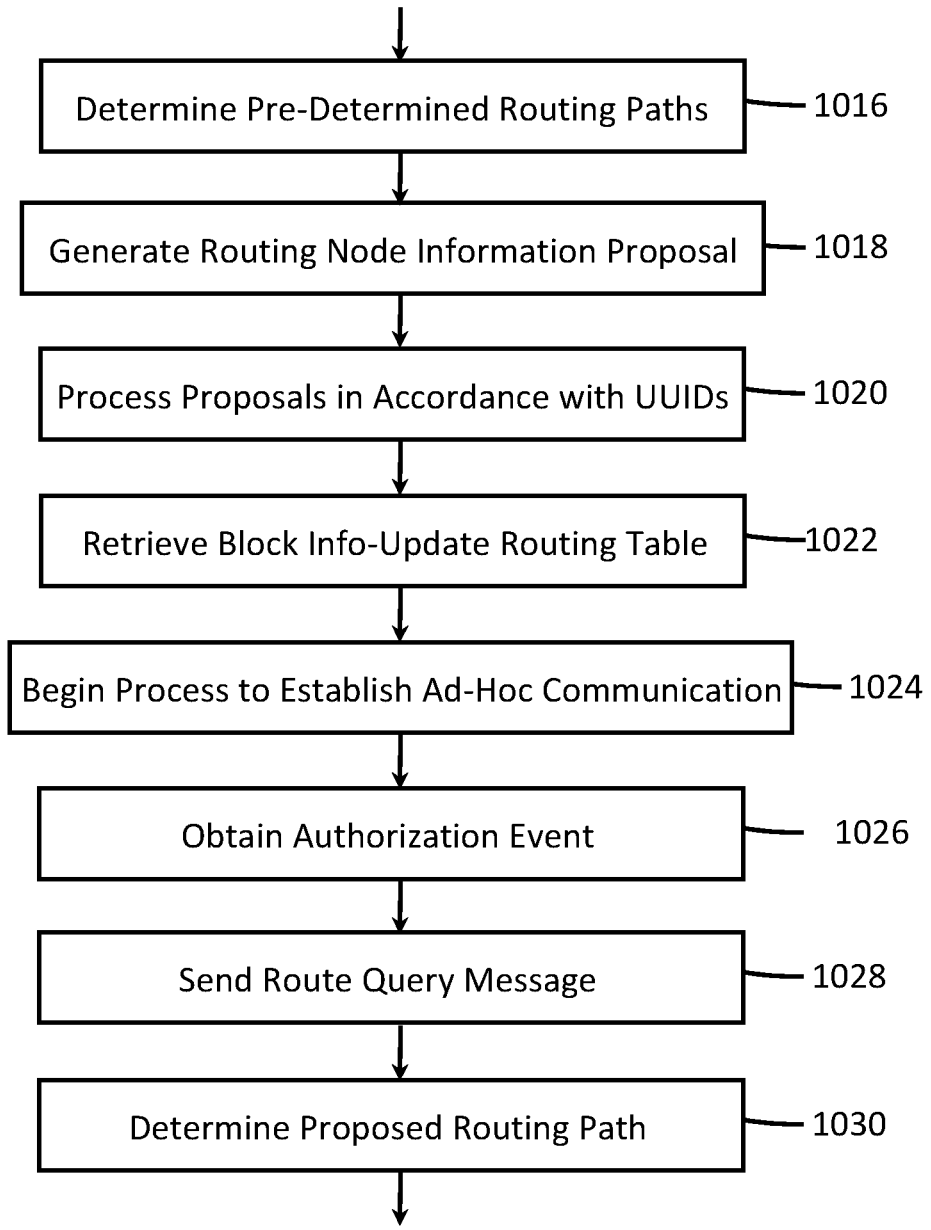
Figure 10C:
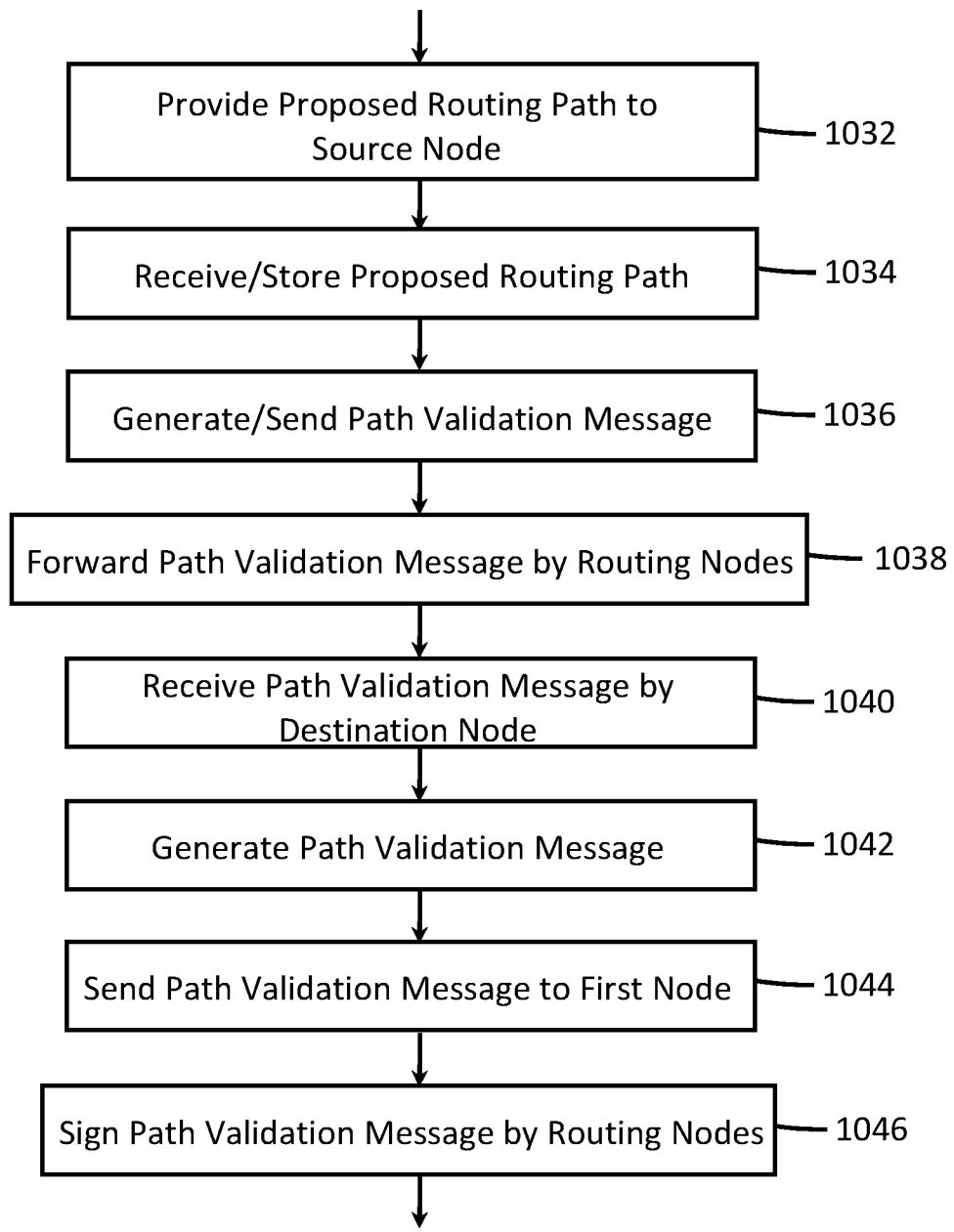
Figure 10D:
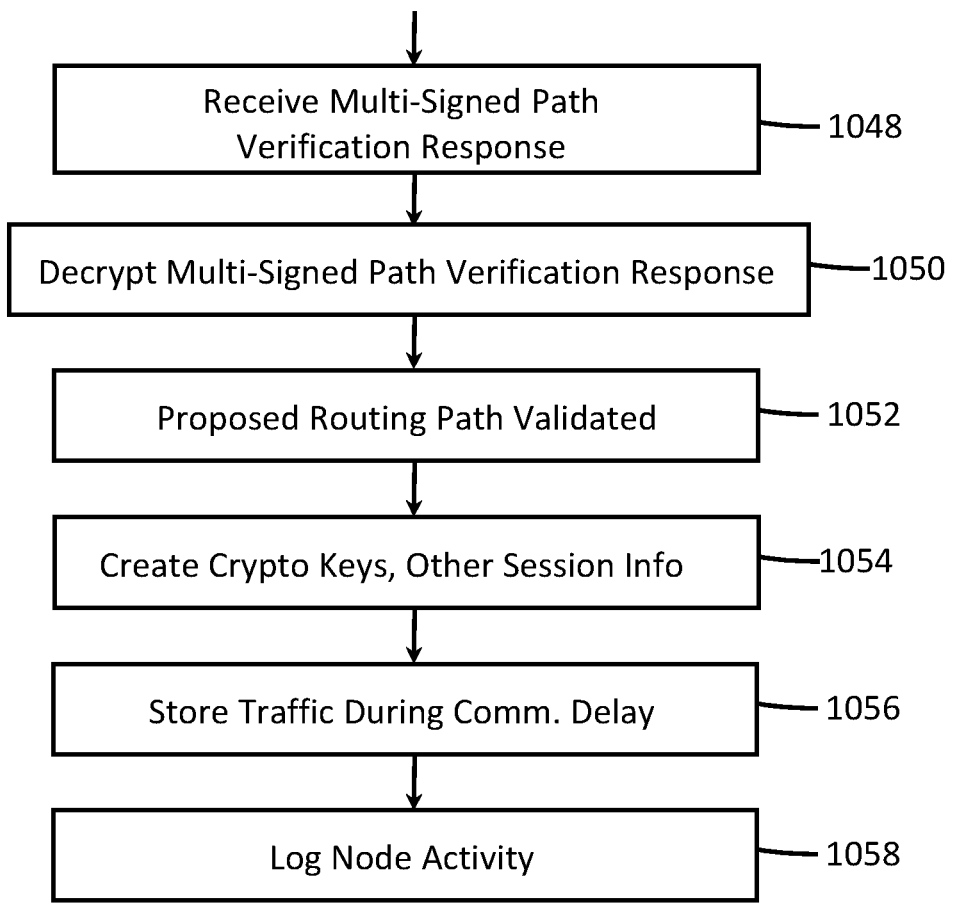

Manager nodes may periodically, or upon the occurrence of one or more predetermined events, such as coming in range of a network that allows access to routing blockchain network 504, provide a portion, or all, of their respective published cryptographic blocks, in an embodiment where at least some local ledger nodes perform validations of routing node information proposals. may be provided to routing blockchain network 504. Routing blockchain network 504 then processes these cryptographic blocks to update a global "application state" of system 500, i.e., an up-to-date status of the routing nodes, managers, and clusters in system 500. Processing of these cryptographic blocks entails blockchain synchronization protocols well known in the art. In one embodiment, such blocks are signed using a privileged private key indicating a higher trust level of the block proposal. This may result in the block being readily accepted into the global application state, or execution of a simplified consensus vote to accept such a block. Blocks may be partitioned into different logical channels on the routing ledger based on the locality information in the block header. Based on the scope of a locality (e.g. a local stand-alone Wi-Fi network versus a secure campus network) further criteria are defined on how to process a privileged block proposal (e.g. direct acceptance on a short-lived, local network, and full consensus validation in a secure campus network). The locality information in at least some of the cryptographic blocks allows manager nodes in system 500 to update their routing information to match the global application state independent of the ordering against other cryptographic blocks pertaining to different localities, FIG. 9 is a functional block diagram of one embodiment of one of the nodes shown in FIG. 6, comprising processor 900, information storage device 902, communication interface 904 and user interface 906 (in some cases).

Processor 900 is configured to provide general operation of a node by executing processor-executable instructions stored in information storage device 902, for example, executable computer code. Processor 900 typically comprises one or more general or specialized microprocessors, microcontrollers, and/or customized ASICs, selected based on computational speed, cost, power consumption, and other factors relevant to each node.

Information storage device 902 is coupled to processor 900 and comprises one or more non-transitory information storage devices, such as static and/or dynamic RAM, ROM, flash memory, or some other type of electronic, optical, or mechanical memory device. Information storage device 902 is used to store processor-executable instructions for operation of each node, respectively. It should be understood that in some embodiments, a portion of information storage device 902 may be embedded into processor 900 and, further, that information storage device 902 excludes propagating signals.

Communication interface 904 is coupled to processor 900, comprising circuitry for sending and receiving information to/from other nodes in system 500 using one or more different communication types, frequencies, protocols, etc. For example, communication interface 904 may comprise well-known circuitry to wireless transmit information in accordance with Wi-Fi protocols as well as well-known circuitry to wirelessly transmit information in accordance with one or more cellular communication protocols.

User interface 906 is coupled to processor 900 and allows a user to access and/or manage resources, i.e., sending and/or receiving traffic streams to/from other nodes, accessing clear or secure documents, entering various commands, such as control commands to operate a remote aerial drone, managing resources, such as requests to print, edit, forward, display, play, render or decrypt resources. User interface 906 may comprise one or more pushbuttons, touchscreen devices, biometric readers, switches, sensors, keypads, and/or microphones that generate electronic signals for use by processor 900 upon initiation by a user. User interface 906 may alternatively, or additionally, comprise one or more seven-segment displays, a cathode ray tube (CRT), a liquid crystal display (LCD), one or more light emitting diode displays (LEDD), one or more light emitting diodes (LEDs), light arrays, or any other type of visual display. Further, the electronic display could alternatively or in addition comprise an audio device, such as a speaker, for audible presentation of resources to a user.

FIGS. 10A-10D represent a flow diagram illustrating one embodiment of a method, performed by one or more nodes of system 500, for routing traffic streams in ad-hoc networks. More specifically, the method describes operations performed by processor 900 in each node, each executing processor-executable instructions stored in a respective information storage device 902. It should be understood that in some embodiments, not all of the steps shown in FIGS. 10A-10D are performed, and that the order in which the steps are carried out may be different in other embodiments. It should be further understood that some minor method steps have been omitted for purposes of clarity.

At block 1000, an issuer entity creates a unique identification code for each node in system 500. In one embodiment, the issuer entity creates a Distributed Identifier (DID) for each node, and stores the DIDs on blockchain verifiable credential network 114, or on some other distributed identification blockchain network, via issuer node 102. The DID typically comprises an identification of each node, a public cryptographic key of a cryptographic public/private key combination created by the issuer entity in order to verify the DID, one or more methods to authenticate the DID, and, in some cases, an identification of two or nodes that define a communication path between two nodes. The DID may additionally comprise a public/private key pair for a vagabond node (i.e., a node that is not a member of a particular network cluster) to join a network cluster, as described in more detail later herein. In one embodiment, the issuer entity additional assigns a security level to each node, generally in accordance with each node's hardware and/or firmware profile and/or an actual or future location of each node.

At block 1002, the issuer entity creates an authorization event template for resources in control or related to the issuer identity, such as digital documents, images, videos, a vehicle, a stream of data from a satellite, a camera, an IoT sensor network, etc., an organization, a person, etc., and stores it on blockchain authorization network 110 via issuer node 102. As described earlier herein, an authorization event template comprises conditions under which a resource associated with the authorization template may be accessed, and permissions that describe how the resource may be managed. The conditions comprise "routing conditions" that define minimum characteristics of all router nodes in a routing path between any source node and any destination node in system during active communications with the resource. For example, an authorization event template could identify a particular digital camera at a particular network address, comprise four routing conditions: all routing nodes must have a security level of 3 or greater, that no routing nodes may be located in a foreign country, that all routing nodes must have a QoS greater than a predetermined metric and that each node should be able to perform obfuscation using burst noise. Additional conditions may be listed in the authorization event template, such as that a user must be looking at a screen of user device 104 in order to display a document, that user device 104 must be of a certain, pre-approved type, etc. In some embodiments, an authorization event template may additionally comprise a section reserved for a listing of all routing nodes that form a path between a source and a destination node, as identified later by a manager node in system 500 in embodiments. In this embodiment, a manager node provides a proposed routing path listing all of the routing nodes needed to form a path between two nodes, and provides the proposed routing path to blockchain authentication network 110. Blockchain authentication network 110, in response, publishes an authorization event on blockchain authorization network 110 comprising the listing of routing nodes needed to route traffic from a source node to a destination node. In one embodiment the authorization event published on blockchain authentication network 110 may contain a list of routing paths specified by their exact sets of routing nodes forming such path together with a weight to allow dynamic selection of the best available path from such set under changing connectivity conditions. In another embodiment, the authorization event template may comprise an identity of each routing node in a path between a fixed source node and a fixed destination node, in an embodiment where a predefined routing path is known and will generally not change. In any of the cases above, the identities of the routing nodes, source node and destination node may comprise a DID of each node.

At block 1004, the issuer entity may create one or more "cluster profiles", each defining one or more characteristics of a particular network cluster. Each cluster profile may comprise a listing of one or more proximity metrics and associated values needed for vagabond nodes to join a cluster or for existing member nodes to remain part of a cluster. The proximity metrics comprise one or more of a node's absolute and/or relative location, a link proximity, a quality-of-service (QoS) proximity, a security proximity, a confidentiality proximity, and/or an observability proximity. For example, the cluster profile may require any vagabond nodes, or current member nodes, to be within 1 mile of a manager node of the cluster, be moving at less than 10 miles per hour, have a packet error rate less than 0.01 percent, have a security level of at least level 2, and be able to obscure transmission traffic, i.e., by using noise. The cluster profiles are published by issuer node 102 on blockchain verifiable credential network 114 (sometimes known as a "DID ledger") typically in the form of DIDs representing specific classes of clusters, or particular clusters. These DIDs may be used to create specific authentication events used by manager nodes to control membership within a given cluster.

The cluster profile may additionally comprise a scope and number of cluster routing nodes needed to validate routing node information proposals from the manager node of each cluster in accordance with consensus voting based distributed ledger validating technology. This information is used in embodiments where local ledger nodes perform validation of routing node information proposals when routing blockchain network 504 is out of range of a member node. For example, the scope of each node for validating routing node information proposals may require at least 10 ledger nodes in a cluster, each having a downtime of no more than 1%, and each having a security level of at least level 3. Different clusters may have different scope and minimum ledger node requirements.

In one embodiment, an issuer entity may define cluster profiles based on one or more proximity criteria. For example, a first cluster profile may be created for people who are traveling in a car while a second cluster profile may be defined for people who are traveling by plane. Each cluster profile may have different proximity metrics that define which nodes can join a cluster, based on a node's proximity metrics. The issuer entity may then publish each cluster profile as a DID on blockchain verifiable credential network 114. Then, manager nodes may select a cluster profile DID based on its own behavior, i.e., if a new manager node was traveling up to 65 mph, but not more than 99 mph, the new manager node may assume it is in a car, and therefore chose a cluster profile DID that is relevant to vehicle travel. New manager nodes may obtain these DIDs by either knowing a domain of DIDs to fetch from a known DID ledger, such as verifiable credential network 114, or be pre-provisioned before a node is sent on a mission.

Figure 11:
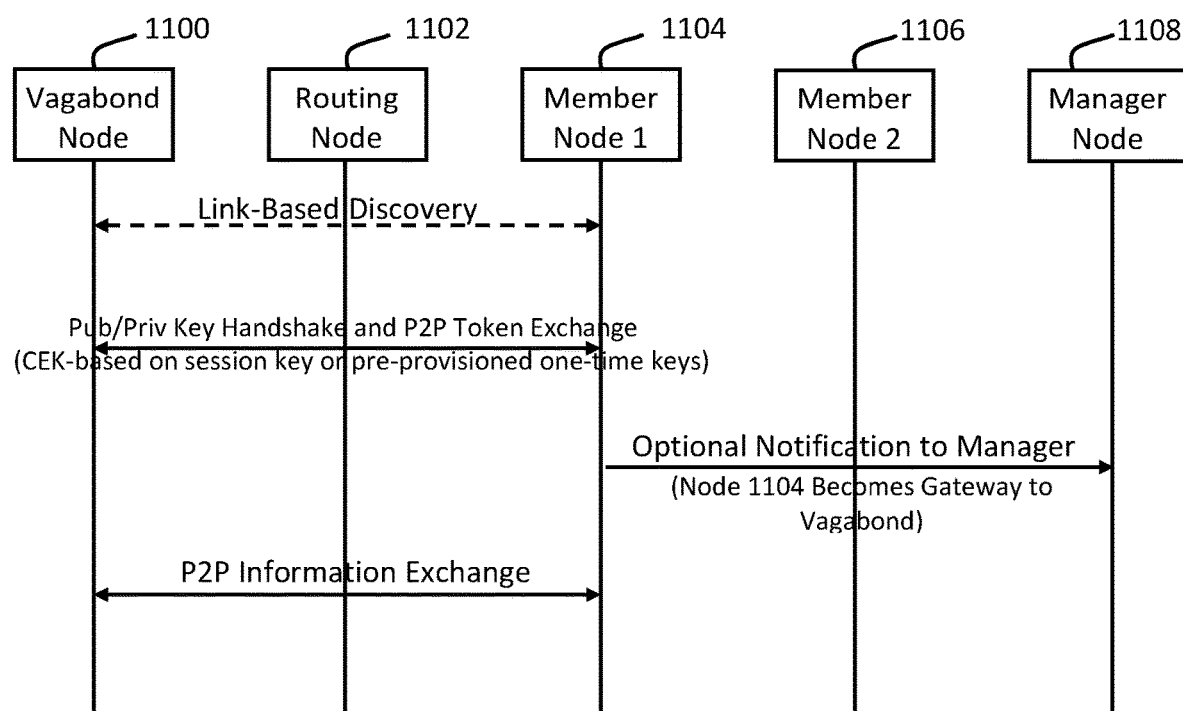
FIG. 11 is a message routing diagram illustrating one embodiment of a discovery/joining process used by a vagabond node to establish a peer-to-peer communicate with a pre-provisioned node.

At block 1006, a vagabond node 1100 initiates a process to join a particular cluster, comprising routing node 1102, member node 1104, member node 1106 and manager node 1108. A vagabond node may be defined as a node that is not a member of a particular network cluster. In one embodiment, the process is shown in FIG. 11.

In one embodiment, the process may begin by processor 900 of a vagabond node broadcasting a cryptographic message via communication interface 904 using a private cryptographic key issued by the issuer entity. The private key may be provisioned "out of band", e.g. written during end-of-line testing in a secure manufacturing facility, manually provisioned by cleared personnel in a secure facility, or exchanged between a provisioning service and a node via a secure channel. Encrypting the message using the private key ensures that only routing nodes in a cluster possessing a corresponding public key can decrypt the message and respond to the vagabond node. Each routing node in a cluster can retrieve the relevant certificate authorities (CAs) for the identities managed by the issuing entity from blockchain verifiable credential network 110, or by other means of secure provisioning. Such CAs subsequently allow a routing node to verify the public key of another specific node managed by the same or a federated issuer. A discovery protocol may be used in accordance with one or more well-known discovery protocols such as LLDP, DHCP, SSDP, DLNA, or others. In another embodiment, processor 900 of a manager node periodically broadcasts a message via communication interface 904 of the manager node to determine if any vagabond nodes are in range of the manager node. Again, this message may contain cryptographic identifiers encrypted by processor 900 of the manager node with the manager node's provisioned private key, thus allowing verification of such identifiers by vagabond nodes managed by the same or a federated issuing entity.

One of the routing nodes in the cluster responds to the vagabond node, or otherwise establishes an initial communication with the vagabond node. It should be understood that instead of communicating with a routing node, the vagabond node may communicate directly with a manager node of the cluster that the vagabond node is attempting to join. In this case, the following method steps may be modified to account for such direct communication.

The initial communication from the vagabond node may comprise a TLS handshake, or equivalent protocol, to authenticate and exchange cryptographic keys necessary to establish a secure session between the vagabond node and the routing node. In one embodiment, processor 900 of the vagabond node stores a domain device certificate in information storage device 902, comprising a public key used by the routing node to authenticate the vagabond node as belonging to a same DID issuer domain, or as a member of a trusted domain.

Processor 900 of the vagabond node then generates a TRUST-OFFER message including its credentials and a proximity profile, as stored in information storage device 902, and sends it to the routing node. The proximity profile comprises a listing of proximity metrics of the vagabond node, such as a location, a velocity, a QoS metric, a security level, a confidentiality level and/or an observability metric. Some of the proximity metrics may be self-determined while some others may be provided by the issuer entity via a DID associated with the vagabond node. The routing node forwards the TRUST-OFFER to the manager node, and processor 900 of the manager node determines whether the vagabond's proximity profile sufficiently matches the cluster's membership criteria, based on a comparison of the vagabond's proximity profile to metrics of the cluster profile stored by the manager node. Processor 900 of the manager node may also authenticate the vagabond node, either by verifying a verifiable presentation provided by the vagabond node using blockchain verifiable credential network 114 when the manager node is able to connect to blockchain verifiable credential network 114, or by verifying the vagabond node's cryptographic identifier signed with its private key against an applicable certificate authority (CA) stored in information storage device 902 of the manager node. If processor 900 of the manager node determines that the vagabond node meets or exceeds one or more of the cluster profile metrics, processor 900 of the manager node generally stores the proximity metrics of the vagabond node and responds with a TRUST-CONFIRMATION message via communication interface 904, which may include the manager node's credentials. This TRUST-CONFIRMATION message is forwarded via at least the routing node to the vagabond, and processor 900 of the vagabond node verifies that the manager node is a valid/trusted device by validating its DID against the issuer domain's public key.

The routing node in direct communication with the vagabond node may be assigned a lower-grade security level than the manager node. In this case, in some embodiments, processor 900 of the vagabond node may authenticate the vagabond node to both the routing node and the manager node, and it may also separately verify an identity of the routing node and the manager before deciding to join a cluster. This minimizes the exposure to lesser trusted routing nodes versus the cluster manager that will receive detailed information about the vagabond node's capabilities.

The TRUST-CONFIRMATION message may comprise a temporary node identification (TNID) for use during the membership-establishing process, and processor 900 of the vagabond mode uses the TNID to communicate directly with the manager node. The TNID is used to hide a permanent identification of a node, such as a MAC address, IMEI, etc. Processor 900 of the vagabond node may then send a JOIN request to the manager node via communication interface 904 to establish a long-lived membership session with this cluster, and processor 900 of the manager node may respond with a list of pre-auth tokens stored in information storage device 902 of the manager node, each token associated with one of the other member nodes of the cluster to facilitate efficient setup of direct, secure member-to-member connections. The manager node may also generate a "permanent" node identification (NID) for the vagabond node, which is used by the vagabond node is all future communications with the manager node and other nodes. At this point, the vagabond node has "joined" the cluster as a member node of the cluster. The pre-auth tokens are generally generated by processor 900 of the manager node for each membership session and are used to authenticate one-time messages between nodes when no stream is established between nodes (e.g. for an occasional status update).

For longer-lived exchanges with another member node, a pre-auth token is used to perform a handshake between two member nodes and subsequently agree on a stream-specific content encryption key (CEK). While traffic streams represent a logical connection between two nodes (either direct or via a number of other routing members) and can be long-lived, the CEK lifetime is typically shorter to limit the amount of data encrypted with a single key.

At block 1008, processor 900 may determine one or more pre-determined routing paths (i.e., listing of routing nodes used to provide a communication link between a source node and a destination node) between the routing node members in its cluster based on one or more of the proximity metrics of each node as stored in information storage device 902. For example, processor 900 may determine a first routing path between a first member node and a second member node that includes a third member routing node and a fourth member routing node, where each of the member routing nodes comprise a security level of 3 or greater, are within 80 meters of each other, and have a packet error rate of less than 0.001%. Processor 900 then stores one or more pre-determined routing paths in information storage device 902.

In block 1010, for scenarios that require specific nodes to communicate with each other two or more times, such nodes can be provisioned by processor 900 of the manager node with a set of well-known node DIDs and pre-established routes to reach them (e.g. a set of fixed routing nodes that will unconditionally be able to provide connectivity in a particular area).

In this case, a vagabond node may perform the same discovery/joining process as described above, but upon identifying another pre-provisioned node (e.g. via its DID or via its keys belonging to a Certificate Authority (CA) reserved for pre-provisioned nodes) immediately establishes a peer-to-peer session with the pre-provisioned node. The pre-provisioned node may notify the manager node about the session, or for cloaked communications, the session may be kept secret between only the two involved nodes.

At block 1012, processor 900 of the manager node may create a universally unique identifier (UUID) that uniquely identifies its member nodes that are more likely to encounter each other, based on metrics such as how often nodes are within a predetermined distance of each other, how long each node is a member of a cluster, etc. The UUID is used to separately group routing node information proposals. For example, cluster 604 may be assigned a UUID of F1A6, while cluster 602 may be assigned a UUID of 36BE. Each blockchain transaction submitted by a manger to routing blockchain network 504, or to two or more ledger nodes, comprises its cluster's UUID, so that resulting cryptographic blocks may be identified as only accounting for member nodes belonging to the same UUID. It should be understood that such UUID may be formed following the specification of the Network Group's RFC 4122, or by other pre-defined algorithms specific to the routing blockchain network deployment that yields an identifier unique within its relevant scope.

At block 1014, processor 900 of the manager node tracks and/or determines one or more performance metrics of each member node, and may receive performance metrics of nodes in other clusters from other clusters' managers, respectively. Processor 900 stores the performance metrics in information storage device 902 in association with each node, respectively. In one embodiment, processor 900 determines an overall performance metric, referred to herein as a "performance score", for each of its member routing nodes, based on individual performance metrics of each node as reported by nodes or determined by processor 900 of the manager node. The performance score is a simple way to signify a node's overall performance. Processor 900 of the manager node stores each node's performance metrics and/or performance score, in information storage device 902.

At block 1016, processor 900 of the manager node may pre-determine one or more routing paths between routing nodes within its cluster, and, in some embodiments, including routing paths between member nodes and nodes in other clusters. Each routing path may be determined based on the performance metrics stored in information storage device 902, as well as one or more proximity metrics. For example, a routing path may be defined between a first node and a second node, comprising a listing of routing nodes that can route traffic between the source node and a destination node based on the proximity and performance metrics stored in information storage device 902.

At block 1018, processor 900 of the manager node may generate a routing node information proposal, in the form of a blockchain transaction, and submit the proposal to routing blockchain network 504, or to two or more pre-designated ledger nodes as specified in the cluster profile stored in information storage device 902 of the manager node, such as two or more member ledger nodes belonging to the cluster of the manager node and/or ledger nodes in other, nearby clusters, when the manager node cannot communicate with routing blockchain network 504. The routing node information proposal may comprise a collection of routing node performance metrics, overall node performance scores (calculated by the manager node), one or more pre-determined routing paths, and/or an entire routing table. Each proposal may also comprise a UUID identifying a locality of the cluster. The routing node information proposal is submitted by processor 900 of the manager node via communication interface 904 to routing blockchain network 504, or to the pre-designated ledger nodes.

At block 1020, each ledger node of routing blockchain network 504, or the pre-designated ledger nodes in one or more clusters, may group routing node information proposals from manager members of system 500 in accordance with each proposal's locality UUID, and then proposals from each MID are cryptographically hashed and the resulting hash added to a validation list. A cryptographic block is created from the validation list, comprising a block header that comprises an identifier of this block for the purpose of e.g. caching published blocks, a locality, or list of localities in form of one or more UUIDs of the proposals validated and contained in the block, the validation list of cryptographic hashes for each proposal/transaction, and proposal/transaction meta-data, such as cluster IDs, localities, and node identifiers, such as node DIDs, associated with the routing node performance metrics/scores. The ledger nodes each sign the block header, and their signatures are added into the block. The meta-data in each block header allows a transaction-reading node, such as any member node in system 500, to only retrieve block elements of interest, e.g. performance metrics/routing paths involving nodes of a particular locality UUID or set of UUIDs. Each routing node information proposals can be verified individually by a transaction-reading node (such as a manager node) from the block header and the validator nodes' signatures in the header.

Note that the use of localization to validate routing node information proposals using UUIDs also generally limits the required scope of ordering during validation. Only routing node information proposals affecting the same locality have to be processed and validated in order, eliminating a common reconciliation issue when multiple, temporarily-partitioned networks validate routing node information proposals in parallel.

In one embodiment, a smart contract is executed by each ledger node, either in routing blockchain network 504 or ledger nodes in one or more clusters, that calculates an overall performance score for each node based on performance metrics reported by manager nodes in their routing node information proposals. For example, the smart contract may evaluate each node's uptime/downtime, security level, packet loss rate, etc. and weigh each metric in accordance with a pre-determined weighing scheme to arrive at an overall performance metric between, for example, 1 and 10, with 1 representing a lowest overall performance score and 10 representing a highest overall performance score. The overall performance score may be included in cryptographic blocks published by routing blockchain network 504 or ledger nodes of one or more clusters.

At block 1022, processor 900 of the manager node may update its routing table by retrieving all, or a portion of, the latest block published by routing blockchain network 504, or the local ledger nodes, either at predetermined times or upon the occurrence of one or more predetermined events (such as when a vagabond node joins a cluster). As discussed above, in one embodiment, only blocks relating to the locality of a manager are retrieved, based on the meta-data or block header contained in each block, and individual routing node information proposals may be retrieved by processor 900, rather than an entire block, via the locality's UUID. Entire blocks may be retrieved when manager nodes are well-connected to routing blockchain network 504, i.e., via a strong cellular link or when the manager node is well within a cellular network, whereas manager nodes with limited connectivity to routing blockchain network 504 may employ a two-step process of first retrieving a block header, and then only transactions of interest defined by e.g. a single or set of locality UUIDs or by a single or set of node DIDs.

Figure 12:
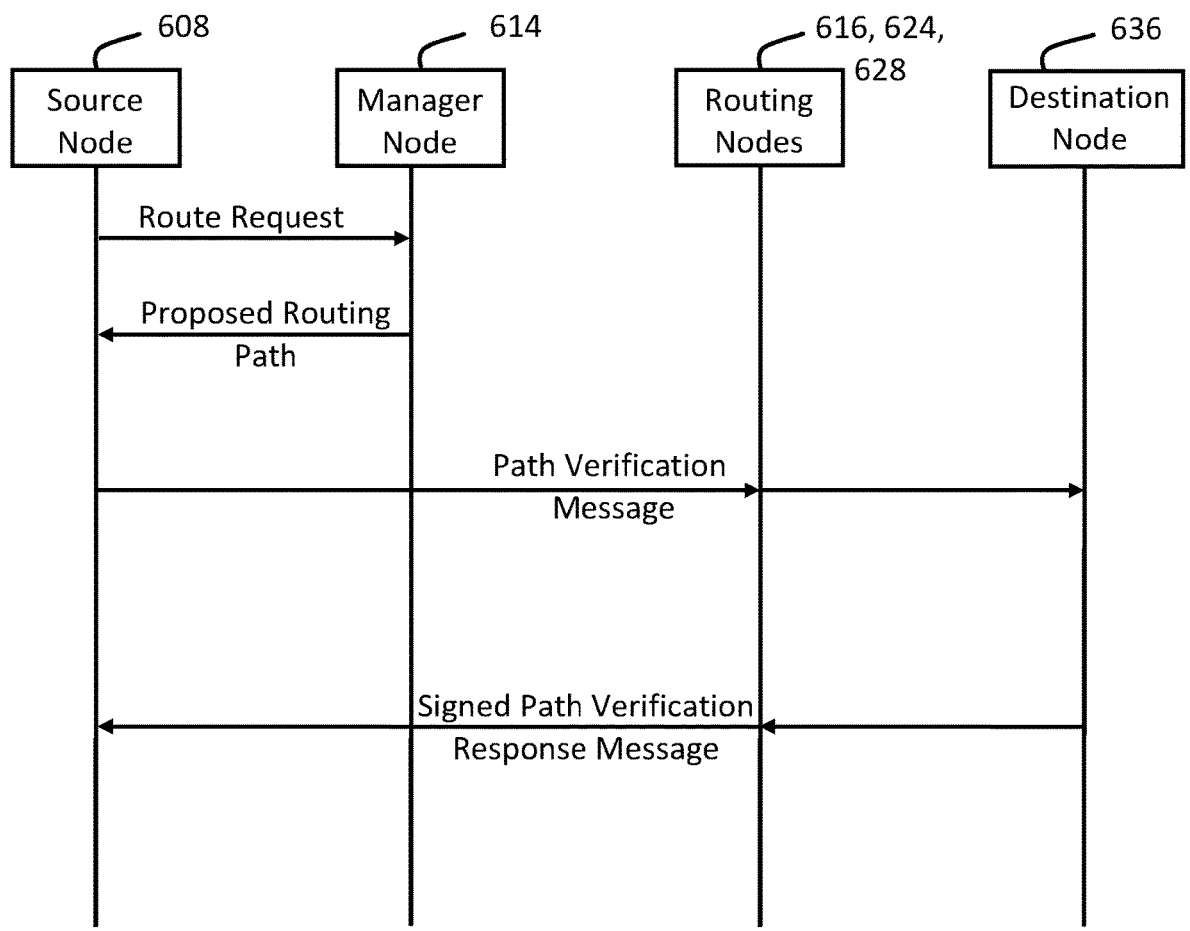
FIG. 12 is a message routing diagram illustrating message flow in the system of FIG. 5 during a portion of the method shown in FIGS. 10A-10D, for establishing ad-hoc routing paths in an ad-hoc communication in the system shown in FIG. 5.

At block 1024, node 608 begins a process to establish ad-hoc communications with another node, either within cluster 608 or outside of cluster 608 with a node in another cluster. Node 608 has already been granted membership in cluster 608, as described above, and may be referenced as a "source node" in the following description. This process utilizes an authorization event stored on blockchain authorization event network 110, defined for a particular resource, that defines certain conditions necessary for the resource to be accessed, including routing conditions associated with routing nodes in a communication path between the source node and a destination node coupled to the resource. The combination of routing nodes that fulfill the routing conditions as set forth in the authorization event may be referred to herein as a stream graph. The process of establishing an ad-hoc routing path may be referred to herein as a stream graph protocol. Reference to the stream graph protocol is shown in FIG. 12.

At block 1026, before or concurrent with source node 608 requesting to establish communications with a destination node, processor 900 of source node 608 may obtain an authorization event from blockchain authorization network 110 for a particular resource, as described above with respect to the method described by FIG. 3, and stores it in information storage device 902. The authorization event identifies the resource (typically using a DID assigned to the resource), an identification of source node 608 (i.e., a DID assigned to source node 608), an identification of a destination node that provides access to the resource (i.e., a DID assigned to a node 636, for example, of cluster 606) and a number of conditions needed to access the resource and/or permissions for managing the resource. Some of the conditions comprise routing conditions, which are conditions that each routing node of a routing path must meet or exceed in order to route traffic between two nodes of system 500, in this example, between source node 608 and destination node 636. In this example, the routing conditions comprise a condition that each routing node must have a security level of 3 or greater, that a first routing node in communication with source node 608 must be operating in a private local network, and that each routing node must be capable of activity obfuscation, i.e., able to generate noise traffic generation, i.e., a purposefully-generated noise floor of useless encrypted data being exchanged continuously, so that the real access is not obvious to an observer of an encrypted traffic stream.

In one embodiment, the authorization event comprises a routing path between the source and destination nodes, in an embodiment where a pre-determined routing path is chosen by the issuer entity. The routing path comprises an identification of each routing node required to establish a communication between the source node and the destination node (and, hence, the resource).

In another embodiment, the authorization event comprises a set of alternative routing paths between the source and destination nodes. Each alternative routing path may have an associated weight for selection preference in the context of the actual availability of such path at a given time. For example, routing path 1 is used when all of the routing nodes have, within the past 5 minutes of a resource request, reported as "active" to one or more respective manager nodes, while routing path 2 is used, comprising one or more fixed, reliable routing nodes, such as a first cellular tower and a second cellular tower, if routing path 1 is unavailable, i.e., one or more routing nodes are not currently active.

At block 1028, in an embodiment where a routing path is unknown to a source node, processor 900 of node 608 sends a route query message to the manager node of cluster 602, in this example, node 614, via communication interface 904. In one embodiment where source node 608 has already received an authorization event associated with a desired resource from blockchain authentication network 110, the route query message comprises an identification of source node 608, an identification of destination node 636 and the routing conditions as listed in the authorization event. In an embodiment where the routing path is known to source node 608, i.e., a listing of routing nodes is provided in the authorization event, this step, as well as the steps described in blocks 1028-1032, are not performed.

At block 1030, processor 900 of manager node 614 receives the route query message and, in response, determines a proposed routing path, comprising one or more routing nodes of cluster 602 and, in this example, one or more nodes in cluster 606. In one embodiment, where the destination node is not provided in the route query message because source node 608 has not received an authorization event from blockchain authorization network 110, the route query message may comprise an identification of a desired resource, for example, a DID associated with the resource. In this embodiment, processor 900 of the manager node submits information to blockchain authorization network 110, such as an identity of source node 608 and the identification of the desired resource, and blockchain authorization network 110 generates an authorization event using an authentication event template associated with the desired resource and the information provided by the manager node. The authorization event comprises an identification of source node 608, an identification of a destination node that is coupled to the resource, and one or more conditions and/or permissions required to access and/or manage the desired resource. Processor 700 of the manager node receives the authorization event and uses it to construct a routing path between the source node and the destination node. Note that the destination node may be coupled to multiple resources, such as a video encoding system that receives multiple video streams from multiple different cameras. In this case, the "resource" may comprise a video stream from one or more of the cameras and, therefore, a single authorization event may be used to define access to multiple resources.

Once the destination node is known, either from the route request message or by receiving an authorization event provided to the manager node, processor 900 of the manager node may determine that destination node 636 is not within cluster 602 by evaluating its routing table stored in information storage device 902 of manager node 614, which does not contain information pertaining to destination node 636, because destination node 636 is not a member of cluster 602. However, information storage device 902 contains routing tables of other clusters, including cluster 606, as each manager node in system 500 periodically shares its routing tables with other manager nodes.

Processor 900 of manager node 614 determines a proposed routing path between source node 608 and destination node 636 using connectivity information stored in the routing tables for cluster 602 and 606, and by excluding any routing nodes that do not meet the routing conditions as provided to manager node 614 by source node 608 in the route request message. In this example, processor 900 determines a proposed routing path comprising nodes 616, 624, and 628, because the routing table shows that source node 608 can connect to node 616, node 616 can connect to node 624, node 624 can connect to node 628, and node 628 can connect to destination node 636, as well as nodes 616, 624, and 628 meeting or exceeding all of the routing conditions provided by source node 608 or by the authorization event. In one embodiment, processor 900 replaces an identification of each node in the proposed routing path (i.e., a DID associated with each routing node) with a NID assigned by each manager node to their respective nodes. Thus, each routing node in the routing path is referred to by its NID rather than some other, permanent identification code, such as a DID or MAC address. This helps maintain anonymity of the routing nodes to potential, unauthorized outside observers. Processor 900 stores the proposed routing path in information storage device 904.

In one embodiment, the proposed routing path further comprises the routing conditions as provided to manager node 614 in the authorization event, in an embodiment where source node 608 did not provide the routing conditions to the manager node in the route request message.

At block 1032, processor 900 of manager node 614 provides the proposed routing path to source node 608 via communication interface 904, sometimes via one or more routing nodes in cluster 602.

At block 1034, processor 900 of source node 608 receives the proposed routing path from manager node 614 via communication interface 904 of source node 608 and stores it in information storage device 902.

At block 1036, processor 900 of source node 608 generates a path validation message, sometimes referred to as a STREAM-GRAPH APPEND message, intended for destination node 636. The path validation message comprises an identification of source node 608, an identification of destination node 636, and a listing of each routing node as identified in the proposed routing path provided by manager node 602. In some embodiments, each node identification comprises each node's respective NID. The path validation message may also comprise a cryptographic key associated with the source node that allows the destination node or any node in the proposed routing path to send encrypted information back to the source node. In one embodiment, such cryptographic key comprises the source node's public key used for public/private key encryption. The path validation message may further comprise the routing conditions from the authorization event, so that each routing node in the path may be informed as to minimum conditions needed to process/forward a traffic stream for a particular resource. The path validation message is sent to the first routing node in the proposed routing path, in this example, routing node 616, by processor 900 via communication interface 904.

At block 1038, the path validation message is received by processor 900 of routing node 616 and forwarded to the next routing node in the path via its communication interface 904, in this example, routing node. 624. This process continues until the path validation message reaches destination node 636.

At block 1040, processor 900 of destination node 636 receives the path validation message via communication interface 902 of destination node 636.

At block 1042, processor 900 of destination node 636 responds to the path validation message by generating a path validation response message, sometime referred to as a STREAM-GRAPH-SOLUTION message. The path validation response message comprises a cryptographically signed listing of each of the routing nodes in the proposed routing path, and in some cases an identification of source node 608 and/or destination node 636. The path validation response message may additionally comprise a nonce created by processor 900 of destination node 636, encrypted by the public key of source node 608. The nonce becomes a shared secret between destination node 636 and source node 608 once it is received by source node 608. Destination node 636 and source node 608 may further exchange a key derivation and rotation algorithm via a set of well-defined DIDs associated with each algorithm, and use the shared secret as a common seed for both endpoints of the routing path.

At block 1044, processor 900 of destination node 636 sends the path validation response message to the first node in the proposed routing path, in reverse order (i.e., a reverse routing path), in this example, routing node 628, by processor 900 of destination node 636 via its communication interface 904.

At block 1046, processor 900 of routing node 628 receives the path validation response message via its communication interface 904, and cryptographically signs the path validation response message. Processor 900 then sends the cryptographically signed path validation response message to the next node in the reverse routing path, i.e., routing node 624. Routing node 624 performs the same actions as routing node 628, cryptographically signing the cryptographically-signed path validation response message received from the previous routing node, in this case, routing node 628. This process continues until the multi-signed path validation response message is received by processor 900 of source node 608.

At block 1048, processor 900 of source node 608 receives the multi-signed path validation response message.

At block 1050, processor 900 of source node 608 decrypts the multi-signed path validation response message by retrieving a public key of each or the routing nodes in the proposed routing path and decrypting the multi-signed path validation response message in accordance with each of the proposed routing nodes' respective public key verified against a corresponding set of CAs.

At block 1052, when processor 900 of source node 608 successfully verifies the multi-signed path validation response message, it knows that the proposed routing path is valid.

It should be understood that instead of each routing node in the proposed routing path signing the path validation response message sent by the destination node, a reverse process may be employed, i.e., each routing node may sign the path validation response message as the path validation message is forwarded from source node 608 to destination node 636. When the multi-signed path validation message is received by destination node 636, it forms a path validation response message comprising the multi-signed path validation message. Then, the path validation response message is simply forwarded from destination node 636 to source node 608 without any of the routing nodes additionally signing the path validation response message. It may, however, by more advantageous to have the routing nodes sign the path validation response message because, in actuality, the path validation message is likely to fail somewhere along the path and multiple attempts may be required to find a currently valid path. Signing the path validation response message on the return makes sure that the intermediate nodes are not wasting internal resources signing messages that ultimately do not succeed.

At block 1054, after determining the validity of the proposed routing path, processor 900 of source node 608 may derive cryptographic session keys, stream-specific RIDs, and/or a schedule of cryptographic keys that causes the cryptographic session keys to change over time or upon the occurrence of a predetermined event. Source node 608 may then commence sending and/or receiving traffic to/from destination node 636.

At block 1056, in one embodiment, during communications between source node 608 and destination node 636, one or more routing nodes along the routing path may encounter a delay in forwarding traffic from one routing node to another. For example, the link between routing node 624 and routing node 628 may comprise a cellular communication link, where delays may be encountered during setup of the cellular link, for example during an initial setup or after an established cellular link is dropped. In this case, one or more of the routing nodes may be capable of temporarily storing traffic, for example, in a cache memory of information storage device 902 while a communication link is being set up by processor 900. The ability to cache traffic may be configurable for each routing node in system 500. A caching ability may be defined by one or more constraints, such as a time limit to limit the amount of traffic that is cached, in one embodiment based on an expected time in order to establish a communication link, based on the type of communication link (i.e, cellular, which may only take a few seconds to establish a communication link vs. a satellite link, which may take longer), and/or whether the traffic should be stored in a secure RAM, regular RAM, or persistent storage of information storage device 902 based on security requirements of the traffic stream. Such caching functions may be configured on a per-stream basis, e.g. all public non-sensitive data may share cache memory in regular RAM, whereas a classified stream is stored in a dedicated cache in secure RAM.

A routing node may be provided with delay thresholds and instructions how to cache data during delays, in one embodiment, in an authorization event in an embodiment where such threshold and instructions information is forwarded from a source node, to each routing node, and to a destination node. Alternatively, nodes in system 500 may be pre-programmed with such information, i.e., when a node's DID is defined by the issuer entity. In yet another embodiment, a node may be pre-programmed with such threshold and instructions and additionally receive potentially different threshold and instructions from a source node via an authorization event. In this case, a node may implement the more restrictive delay mitigation measures of the two sets of threshold and instructions.

At block 1058, in one embodiment, one or more routing nodes along a routing path may be configured with an ability to measure and record information associated with their past and present traffic stream activities, referred to as a "logging functionality". Logging may be an important tool to not only identify system errors, but to also continuously monitor system 500 for correct operation. Log levels can be defined per stream, i.e., one or more thresholds at which a stream characteristic is recorded, such as a bit-error-rate exceeding a predetermined threshold, or a time threshold that a routing node is unresponsive, etc., and logs can optionally be encrypted to ensure that an unauthorized observer cannot deduce activity of routing nodes in a routing path. For example, upon processing a STREAM-GRAPH-RESPONSE, an intermediate routing node may generate a stream-specific, cryptographic log key and securely transmit this key to a logging service manager (not shown) in a separate transaction (e.g. via e TLS session to a well-known service endpoint).

In the description above, certain aspects and embodiments of the invention may be applied independently and some of them may be applied in combination as would be apparent to those of skill in the art. For the purposes of explanation, specific details are set forth in order to provide a thorough understanding of embodiments of the invention.

The above description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Although specific details are given to provide a thorough understanding of at least one embodiment, it will be understood by one of ordinary skill in the art that some of the embodiments may be practiced without disclosure of these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a method, a process or an algorithm performed by a processor, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. The terms "computer-readable medium", "memory", "storage medium", and "information storage device" includes, but is not limited to, portable or non-portable electronic information storage devices, optical storage devices, and various other mediums capable of storing, containing, or carrying instruction(s) and/or data. These terms each may include a non-transitory medium in which data can be stored and that does not include carrier waves and/or transitory electronic signals propagating wirelessly or over wired connections. Examples of a non-transitory medium may, include, but are not limited to, a magnetic disk or tape, optical storage media such as compact disk (CD) or digital versatile disk (DVD), flash memory, RAM. ROM, flash memory, solid state disk drives (SSD), etc. A computer-readable medium or the like may have stored thereon code and/or processor-executable instructions that may represent a method, algorithm, procedure, function, subprogram, program, routine, subroutine, or any combination of instructions, data structures, or program statements.

Furthermore, embodiments may be implemented by hardware, software, firmware, middleware, microcode, hardware description languages, or any combination thereof. When implemented in software, firmware, middleware or microcode, the program code, i.e., "processor-executable code", or code symbols to perform the necessary tasks (e.g., a computer-program product) may be stored in a computer-readable or machine-readable medium. A processors) may perform the necessary tasks.

We claim:

1. A method performed by a manager node of an ad-hoc network cluster, comprising:
   generating, by a processor of the manager node, a routing node information proposal, the routing node information proposal comprising one or more routing node performance metrics of one or more routing nodes within the network cluster, the routing node information proposal in a form of a distributed ledger transaction;
   providing, by the processor via a communication interface, the routing node information proposal to a distributed ledger;
   retrieving, by the processor via the communication interface, a cryptographic block from the distributed ledger, the cryptographic block comprising updated routing node information of the one or more routing nodes; and
   determining, by the processor, a proposed routing path based on the updated routing node information.

2. The method of claim 1, wherein determining a proposed routing path based on the updated routing node information comprises:
   receiving a request from a member node of the network cluster to establish an ad-hoc communication, the request comprising an identification of a resource to access;
   receiving, by the processor via the communication interface, an authorization record from a second distributed ledger, the authorization record comprising one or more conditions for accessing the resource; and
   selecting, by the processor, two or more routing nodes for accessing the resource based on the one or more conditions of the authorization record and the updated routing node information.

3. The method of claim 1, wherein the step of generating the routing node information proposal is performed in response to the processor, via the communication interface, receiving a request for an ad-hoc communication from a source node of the cluster.

4. The method of claim 1, further comprising:
   calculating, by the processor, an overall performance score for the one or more routing nodes, the overall performance score based on at least a first performance metric of the one or more routing nodes and a second performance metric of the one or more routing nodes;
   wherein the routing node performance metric comprises the overall performance score.

5. The method of claim 4, further comprising:
   calculating, by the processor, two or more performance scores for a first routing node of the at least one or more routing nodes, a first performance score related to a first security level supported by the first routing node and at least a second performance score related to a second security level supported by the first routing node;
   wherein the routing node performance metric comprises the two or more performance scores.

6. The method of claim 4, wherein the first performance metric comprises a data throughput rate of the one or more routing nodes.

7. The method of claim 1, further comprising:
   assigning, by the processor, a universally unique identifier to the network cluster, the universally unique identifier for uniquely identifying the one or more routing nodes of the network cluster, the routing node information proposal comprising the universally unique identifier;
   wherein each cryptographic block generated by the distributed ledger comprises a particular universally unique identifier identifying a particular network cluster, and retrieving the cryptographic block from the distributed ledger comprises retrieving, by the processor via the communication interface, the cryptographic block that comprises the universally unique identifier assigned by the processor.

8. The method of claim 1, wherein providing the routing node information proposal to the distributed ledger comprises:
   determining, by the processor, that the manager node is not able to communicate with the distributed ledger;
   determining, by the processor, two or more ledger nodes within cluster, the ledger nodes for validating the routing node information proposal when the manager node is not able to communicate with the distributed ledger; and
   in response to determining that the manager node is not able to communicate with the distributed ledger, providing, by the processor via the communication interface, the routing node information proposal to the two or more ledger nodes for the two or more ledger nodes to validate the routing node information proposal.

9. The method of method of 1, wherein providing the routing node information proposal to a distributed ledger comprises:
   determining, by the processor, that the manager node is in range of a routing blockchain network; and providing, by the processor via the communication interface, the routing node information proposal to the routing blockchain network when the manager node is in range of the in range of a routing blockchain network; and providing, by the processor via the communication interface, the routing node information proposal to two or more ledger nodes within the cluster when the manager node is not in range of the in range of a routing blockchain network.

10. The method of claim 1 wherein the updated routing node information comprises an overall performance score calculated by the distributed ledger for the one or more routing nodes.

11. The method of claim 1, wherein the updated routing node information of the one or more routing nodes in the cryptographic block comprises one or more performance metrics of the one or more routing nodes over time.

12. The method of claim 1, further comprising:
determining, by the processor, that the manager node is not able to communicate with the distributed ledger;
in response to determining that the manager node is not able to communicate with the distributed ledger, including, by the processor, a localization identifier in the routing node information proposal, the localization identifier for uniquely identifying the network cluster; wherein providing the routing node information proposal to a distributed ledger comprises providing, by the processor via the communication interface, the routing node information proposal to a second distributed ledger comprising two or more ledger nodes in the network cluster, wherein the two or more ledger nodes produce the cryptographic block, the cryptographic block comprising the localization identifier; and providing the cryptographic block with the localization identifier to the distributed ledger when the manager node is able to communicate with the distributed ledger; wherein the distributed ledger validates cryptographic blocks received from the manager node and other manager nodes in an order based on the localization identifier.

13. A manager node of an ad-hoc network cluster, comprising:
a communication interface for sending and receiving information to other nodes;
a non-transitory information storage device for storing processor-executable instructions and performance metrics of routing nodes within the network cluster; and a processor coupled to the communication interface and the non-transitory information storage device, for executing the processor-executable instructions that causes the processor to perform the steps of:
generating a routing node information proposal, the routing node information proposal comprising one or more routing node performance metrics of one or more routing nodes within the network cluster, the routing node information proposal in a form of a distributed ledger transaction;
providing the routing node information proposal to a distributed ledger;
retrieving a cryptographic block from the distributed ledger, the cryptographic block comprising updated routing node information of the one or more routing nodes; and
determining a proposed routing path based on the updated routing node information.

14. The manager node of claim 13, wherein the instructions that causes the processor to determine a proposed routing path based on the updated routing node information comprises instructions that causes the processor to perform the steps of:
receiving a request from a member node of the network cluster to establish an ad-hoc communication, the request comprising an identification of a resource to access;
receiving an authorization record from a second distributed ledger, the authorization record comprising one or more conditions for accessing the resource; and
selecting two or more routing nodes for accessing the resource based on the one or more conditions of the authorization record and the updated routing node information.

15. The manager node of claim 13, wherein the instructions that causes the processor to generate the routing node information proposal are performed in response to the processor, via the communication interface, to receive a request for an ad-hoc communication from a source node of the cluster.

16. The manager node of claim 13, comprising further processor-executable instructions that causes the processor to perform the steps of:
calculating an overall performance score for the one or more routing nodes, the overall performance score based on at least a first performance metric of the one or more routing nodes and a second performance metric of the one or more routing nodes;
wherein the routing node performance metric comprises the overall performance score.

17. The manager node of claim 16, comprising further processor-executable instructions that causes the processor to perform the steps of:
calculating two or more performance scores for a first routing node of the at least one or more routing nodes, a first performance score related to a first security level supported by the first routing node and at least a second performance score related to a second security level supported by the first routing node;
wherein the routing node performance metric comprises the two or more performance scores.

18. The manager node of claim 16, wherein the first performance metric comprises a data throughput rate of the one or more routing nodes.

19. The manager node of claim 13, comprising further processor-executable instructions that causes the processor to perform the steps of:
assigning a universally unique identifier to the network cluster, the universally unique identifier for uniquely identifying the one or more routing nodes of the network cluster, the routing node information proposal comprising the universally unique identifier;
wherein each cryptographic block generated by the distributed ledger comprises a particular universally unique identifier identifying a particular network cluster, and the instructions for retrieving the cryptographic block from the distributed ledger comprises instructions that causes the processor to retrieve the cryptographic block that comprises the universally unique identifier assigned by the processor.

20. The manager node of claim 13, wherein the instructions that causes the processor to provide the routing node information proposal to the distributed ledger comprises instructions that causes the processor to perform the steps of:

determining that the manager node is not able to communicate with the distributed ledger;

determining two or more ledger nodes within cluster, the ledger nodes for validating the routing node information proposal when the manager node is not able to communicate with the distributed ledger; and in response to determining that the manager node is not able to communicate with the distributed ledger, providing the routing node information proposal to the two or more ledger nodes for the two or more ledger nodes to validate the routing node information proposal.

21. The manager node of method of 13, wherein the instructions for providing the routing node information proposal to a distributed ledger comprises instructions that causes the processor to perform the steps of:

determining that the manager node is in range of a routing blockchain network; and providing the routing node information proposal to the routing blockchain network when the manager node is in range of the in range of a routing blockchain network; and providing the routing node information proposal to two or more ledger nodes within the cluster when the manager node is not in range of the in range of a routing blockchain network.

22. The manager node of claim 13 wherein the updated routing node information comprises an overall performance score calculated by the distributed ledger for the one or more routing nodes.

23. The manager node of claim 13, wherein the updated routing node information of the one or more routing nodes in the cryptographic block comprises one or more performance metrics of the one or more routing nodes over time.

24. The manager node of claim 13, comprising further instructions that causes the processor to perform the steps of:

determining that the manager node is not able to communicate with the distributed ledger;

in response to determining that the manager node is not able to communicate with the distributed ledger, including a localization identifier in the routing node information proposal, the localization identifier for uniquely identifying the network cluster;

wherein the instructions that cause the processor to provide the routing node information proposal to a distributed ledger comprises instructions that causes the processor to perform the steps of:

providing, via the communication interface, the routing node information proposal to a second distributed ledger comprising two or more ledger nodes in the network cluster, wherein the two or more ledger nodes produce the cryptographic block, the cryptographic block comprising the localization identifier; and providing the cryptographic block with the localization identifier to the distributed ledger when the manager node is able to communicate with the distributed ledger;

wherein the distributed ledger validates cryptographic blocks received from the manager node and other manager nodes in an order based on the localization identifier.

25. A non-transitory computer-readable medium having processor-executable instructions embedded thereon which, when executed by a processor, causes a manager node to perform the steps of:

generating a routing node information proposal, the routing node information proposal comprising one or more routing node performance metrics of one or more routing nodes within the network cluster, the routing node information proposal in a form of a distributed ledger transaction;

providing the routing node information proposal to a distributed ledger;

retrieving a cryptographic block from the distributed ledger, the cryptographic block comprising updated routing node information of the one or more routing nodes; and determining a proposed routing path based on the updated routing node information.

\* \* \* \* \*